US005771336A

United States Patent [19]

Polny, Jr.

[11] Patent Number: 5,771,336
[45] Date of Patent: Jun. 23, 1998

[54] ELECTRICALLY STABLE METHODS AND APPARATUS FOR CONTINUOUSLY ELECTROHEATING FOOD

[76] Inventor: Thaddeus J. Polny, Jr., 705 Suburban Rd., Union, N.J. 07083

[21] Appl. No.: 617,110

[22] Filed: Mar. 18, 1996

Related U.S. Application Data

[62] Division of Ser. No. 470,020, Jun. 6, 1995, which is a division of Ser. No. 71,572, Jun. 3, 1993, which is a continuation-in-part of Ser. No. 7,553, Jan. 22, 1993, abandoned.

[51] Int. Cl.[6] .................................................. H05B 3/60
[52] U.S. Cl. ...................... 392/321; 392/314; 392/338; 99/358; 426/244
[58] Field of Search .................................. 392/320, 321, 392/314, 319, 328, 338; 219/771, 772; 426/244, 614, 521; 99/358, 451; 422/22, 307; 210/748; 204/228, DIG. 7

[56] References Cited

U.S. PATENT DOCUMENTS

| 535,267 | 3/1895 | Wagner et al. . |
| 684,746 | 10/1901 | Chapman ................................. 392/320 |
| 731,339 | 6/1903 | Chapman . |
| 1,147,558 | 7/1915 | Shelmerdine . |

(List continued on next page.)

FOREIGN PATENT DOCUMENTS

| 2100618 | 1/1994 | Canada . |
| 0 032 840 | 7/1981 | European Pat. Off. . |
| 0 457 179 | 11/1981 | European Pat. Off. . |
| 230-978-A | 1/1986 | European Pat. Off. . |

(List continued on next page.)

OTHER PUBLICATIONS

Alkslog, L., "High Temperature asteurization of Liquid Whole Egg," Process Technology, pp. 16–18.

"Annual Report of Cooperative Regional Projects Supported by Allotment of the Regional Fund, Hatch Act, as Amended Aug. 11, 1955, Jan. 1 to Dec. 31, 1984," Raleigh, North Carolina. Approved by Chairman Hershell Ball, Jr. on Mar. 14, 1985.

(List continued on next page.)

*Primary Examiner*—Tu B. Hoang
*Attorney, Agent, or Firm*—Fish & Neave; Jeffrey H. Ingerman

[57] ABSTRACT

Electrically stable electroheating apparatus and methods for continuously treating pumpable food are provided. The electrodes of the electroheater are connected to a source of AC electric current which resistively heats the food by passing current through it. The electrodes of the electroheating cell are also connected in parallel with at least one resistor. The stabilized electroheater provides long run times and prevents arcing within the food.

13 Claims, 6 Drawing Sheets

U.S. PATENT DOCUMENTS

| | | |
|---|---|---|
| 1,360,447 | 11/1920 | Rudd . |
| 1,431,580 | 10/1922 | Graetzer et al. ................... 392/320 |
| 1,522,188 | 1/1925 | Hull . |
| 1,775,579 | 9/1930 | Woodrich . |
| 1,813,064 | 7/1931 | Matzka . |
| 1,934,703 | 11/1933 | Golden . |
| 2,081,243 | 5/1937 | Macy . |
| 2,438,582 | 3/1948 | Southerwick . |
| 2,473,041 | 6/1949 | Urbain et al. . |
| 2,495,415 | 1/1950 | Marshall . |
| 2,510,796 | 6/1950 | Brown . |
| 2,550,584 | 4/1951 | Mittelmann . |
| 2,564,579 | 8/1951 | Parmenter et al. . |
| 2,565,311 | 8/1951 | Koonz et al. . |
| 2,582,281 | 1/1952 | Robertson . |
| 2,585,970 | 2/1952 | Shaw . |
| 2,685,833 | 8/1954 | Hagopian . |
| 2,799,216 | 7/1957 | Coulter . |
| 2,838,640 | 6/1958 | Mann et al. . |
| 3,315,681 | 4/1967 | Poppendiek . |
| 3,625,843 | 12/1971 | Doevenspeck . |
| 3,632,962 | 1/1972 | Cherniak . |
| 3,709,802 | 1/1973 | Okuhara et al. . |
| 3,753,886 | 8/1973 | Myers . |
| 3,796,857 | 3/1974 | Henley et al. . |
| 3,855,531 | 12/1974 | Fielibert et al. . |
| 3,867,610 | 2/1975 | Quaintance . |
| 3,877,360 | 4/1975 | Vigerstrom . |
| 3,919,052 | 11/1975 | Fresnel et al. . |
| 3,949,099 | 4/1976 | Kaufman . |
| 4,091,119 | 5/1978 | Bach . |
| 4,109,566 | 8/1978 | Vigerstrom . |
| 4,177,719 | 12/1979 | Balaguer . |
| 4,211,887 | 7/1980 | Williamson ................... 13/6 |
| 4,260,874 | 4/1981 | Will . |
| 4,369,351 | 1/1983 | Massey et al. ................... 392/312 |
| 4,378,846 | 4/1983 | Brock ................... 166/303 |
| 4,386,110 | 5/1983 | Komeyasu et al. . |
| 4,417,132 | 11/1983 | Simpson . |
| 4,420,382 | 12/1983 | Riedl . |
| 4,434,357 | 2/1984 | Simpson et al. . |
| 4,457,221 | 7/1984 | Geren . |
| 4,496,594 | 1/1985 | Miyahara . |
| 4,522,834 | 6/1985 | Miyahara . |
| 4,524,079 | 6/1985 | Hofmann . |
| 4,695,472 | 9/1987 | Dunn et al. . |
| 4,723,483 | 2/1988 | Papchenko et al. . |
| 4,739,140 | 4/1988 | Reznik . |
| 4,808,425 | 2/1989 | Swartzel et al. . |
| 4,838,154 | 6/1989 | Dunn et al. . |
| 4,853,238 | 8/1989 | Huang . |
| 4,857,343 | 8/1989 | Hekal ................... 426/239 |
| 4,871,559 | 10/1989 | Dunn et al. . |
| 4,957,759 | 9/1990 | Swartzel et al. . |
| 4,957,760 | 9/1990 | Swartzel et al. . |
| 4,959,525 | 9/1990 | Stirling et al. . |
| 4,971,819 | 11/1990 | Miyahara . |
| 4,971,827 | 11/1990 | Huang . |
| 4,994,291 | 2/1991 | Swartzel et al. . |
| 5,019,407 | 5/1991 | Swartzel et al. . |
| 5,019,408 | 5/1991 | Swartzel et al. . |
| 5,048,404 | 9/1991 | Bushnell et al. . |
| 5,084,153 | 1/1992 | Mosse et al. . |
| 5,091,152 | 2/1992 | Thomas, Sr. . |
| 5,105,724 | 4/1992 | Swartzel et al. . |
| 5,167,976 | 12/1992 | Papetti . |
| 5,226,106 | 7/1993 | Stirling . |
| 5,235,905 | 8/1993 | Bushnell et al. . |
| 5,288,471 | 2/1994 | Corner . |
| 5,290,583 | 3/1994 | Reznik et al. . |
| 5,326,530 | 7/1994 | Bridges . |
| 5,415,882 | 5/1995 | Knipper et al. ................... 426/244 |
| 5,514,391 | 5/1996 | Bushnell et al. ................... 426/237 |

FOREIGN PATENT DOCUMENTS

| | | |
|---|---|---|
| 0 497 099 | 8/1992 | European Pat. Off. . |
| 0 685 987 | 12/1995 | European Pat. Off. . |
| 2513087 | 3/1983 | France . |
| 945 582 | 7/1956 | Germany . |
| 1075570 | 2/1960 | Germany ................... 392/314 |
| 47-48542 | 12/1972 | Japan ................... 392/314 |
| 24735 | 2/1931 | Netherlands ................... 392/314 |
| 639158 | 12/1978 | U.S.S.R. . |
| 683034 | 8/1979 | U.S.S.R. . |
| 895141 | 5/1962 | United Kingdom ................... 392/320 |
| 904371 | 8/1962 | United Kingdom . |
| 2068200 | 8/1981 | United Kingdom . |
| 2140668 | 12/1984 | United Kingdom . |
| 2 147 776 | 5/1985 | United Kingdom . |
| 2 164 732 | 3/1986 | United Kingdom . |
| 2 282 052 | 3/1995 | United Kingdom . |
| WO 8900384 | 1/1989 | WIPO . |
| WO 9015547 | 12/1990 | WIPO . |
| WO 9319620 | 10/1993 | WIPO . |
| WO 94/11681 | 5/1994 | WIPO . |
| WO 94/18845 | 9/1994 | WIPO . |
| WO 95/10943 | 4/1995 | WIPO . |

OTHER PUBLICATIONS

Ball, H.R. Jr. et al., "Function and Shelf Life of Ultrapasteurized, Aseptically Packaged Whole Egg" Abstract, Poultry Science Association Annual Meeting–Jul. 29–Aug. 2, 1985, Iowa State University, Ames.

Dinnage, D.F., "Continuous Aseptic Processing Using the Ohmic Heating Process," Changing Food Technology 3, Food Technology: A view of the Future (Selected Papers from the Sixth Eastern Food Science & Technology Conference), Edited by Allen Freed (1990), pp. 29–41.

Essary, E.O. et al., "New Uses of Heated Aseptically Packaged Fluid Egg Products," Departments of Food Science and Technology, and Chemical Engineering, Virginia Polytechnic Institute and State University, Blacksburg, VA, 1983.

Hamid–Samimi, M.H. et al., "Aseptic Packaging of Ultrapasteurized Egg, Design and Economic Considerations," publication date unknown, but a copy was transmitted to Mr. Merle Kirk under cover of a letter dated Aug. 21, 1985 from Prof. Hersell Ball, Jr.

Hamid–Samimi, M.H., "Criteria Development for Extended Shelf–Life Pasteurized Liquid Whole Egg," Ph.D. Thesis, North Carolina State University, Raleigh, North Carolina, 1984.

Hanson et al., "Pasteurization Of Liquid Egg Products," Received for publication Nov. 16, 1946 pp. 277–283.

Jacobs, L.C., "Aseptic packaging promises new role for pasteurized liquid eggs," Apr. 1981.

Madsen, M., "Pasteurizing of Egg Products," Sundhedsplejen (Dec., 1958), 102–105 and translation thereof.

Murdock et al., "The Pasteurization Of Liquid Whole Egg," issued from the Office of Medical Research Council, 38, Old Queen Street, Westminster, S.W.I.

Palaniappan, S. et al., "Effects of Electrically on Microorganisms: A review," Journal of Food Processing and Preservation vol. 14, No. 5 (Oct., 1990), pp. 383–414.

Palaniappan, S. et al., "Experimental Studies on Electroconductive (Ohmic) Heating of Liquids," prepared for an American Society of Agricultural Engineers Meeting Presentation (Dec. 12–15, 1989), Paper No. 89–6553.

Palaniappan, S., "Ohmic Heating of Foods: Studies on Microbicidal Effect of Electricity, Electrical Conductivity of Foods, and Heat Transfer In," Ph.D. Thesis, The Ohio State University, 1991.

Parrott, D.L. et al., "The Aseptic Processing of Fluids Containing Particulates from 1/8" to 1" size," prepared for presentation at American Institution of Chemical Engineers 1988 Summer Meeting (Aug. 21–24, 1988) (Unpublished), Paper No. 60e.

Parrott, D.L., "Use of Ohmic Heating for Aseptic Processing of Food Particulates," Food Technology (Dec., 1992), pp. 68–72.

Reznik, D., "Electroheating," Dec., 1989.

Russell, M.J., "Live Long and Prosper," Food Engineering, Dec., 1992, pp. 77–80.

Sastry, S.K., "A Model for Heating of Liquid–Particle Mixtures in a Continuous Flow Ohmic Heater," Journal of Food Process Engineering 15 (1992), pp. 263–278.

Sastry, S.K. et al., "Mathematical Modeling and Experimental Studies on Ohmic Heating of Liquid–Particle Mixtures in a Static Heater," Journal of Food Process Engineering 15 (1992), pp. 241–261.

Sastry, S.K. et al., "Ohmic Heating of Liquid–Particle Mixtures," Food Technology (Dec., 1992), pp. 64–67.

Sill, M., "NSCU researchers crack the secret of long shelflife for eggs," *The News and Observer*, Raleigh, North Carolina, Sep. 3, 1985.

Stone, W.K. et al., "Aseptic Processing of Liquid Eggs Pasteurized in a Teflon Heat Exchanger," 1983.

Winter et al., "Pasteurization of Liquid–Egg Products I. Bacteria Reduction in Liquid Whole Egg and Improvement in Keeping Quality," Journal Paper No. J–1300 of the Town Agricultural Experimental Station, received for publication on Jun. 18, 1945, 229–245.

Winter et al., "Pasteurization of Liquid Egg Products III. Destruction of Salmonella in Liquid Whole Egg," American Journal of Public Health, vol. 36, pp. 451–460 (1946).

ELECTRICALLY STABLE METHODS AND APPARATUS FOR CONTINUOUSLY ELECTROHEATING FOOD

CROSS REFERENCE TO RELATED APPLICATIONS

This is a division of U.S. patent application Ser. No. 08/470,020, filed Jun. 6, 1995, which is a division of U.S. patent application Ser. No. 08/071,572, filed Jun. 3, 1993, which is a continuation-in-part of U.S. patent application Ser. No. 08/007,553, filed Jan. 22, 1993, now abandoned.

FIELD OF THE INVENTION

The instant invention relates to methods and apparatus for electroheating, processing, pasteurizing and/or cooking food.

BACKGROUND OF THE INVENTION

There are a number of techniques known in the prior art for pasteurizing and processing liquid egg. The most widely used approaches involve the use of conventional plate heat exchangers, steam infusion systems, or combinations of both. However, these techniques have limitations because of the physical nature of liquid egg. Plate heat exchangers are very popular in that they are very efficient and relatively simple to use. However, plate heat exchangers are limited in the amount of heat that they can convey to liquid eggs without causing irreparable harm such as undue coagulation, scorching, caking on the heater plate, and the like. Furthermore, the highest effective temperature range over which heating can be accomplished for liquid egg by plate heat exchangers is limited to between about 150° F. to about 160° F., particularly for long term, continuous processing techniques. As a latter of practical reality, plate heat exchangers can only be used to heat liquid whole egg to pasteurization temperatures of between about 140° F. and about 155° F. for an extended period of time.

Steam infusion systems can be used to obtain much higher temperatures such as, for example, 165° F. However, it is necessary to separate the condensed steam and residual water from the liquid egg during processing. The equipment used for steam pasteurizing liquid eggs is also quite expensive and elaborate.

Electroheating has been used successfully for the heat treatment, and principally the cooking, of foodstuffs. A particularly important technique for electroheating is described by Mr. David Reznik in U.S. Pat. No. 4,739,140, incorporated herein by reference. Mr. Reznik found that when an AC electric current at a frequency exceeding 100 Hz is passed through food, heating of the food can be accomplished without substantial electrolysis or reaction between the food product and the electrodes.

Mr. Reznik's patent does not describe the use of concentric electrodes for electroheating food or the advantages of using concentric electrodes to heat liquid egg. Similarly, Mr. Reznik's '140 patent does not describe the particularly advantageous interplay of electroheating cells an described herein. Mr. Reznik's '140 patent also does not describe pasteurizing egg. Therefore, this patent does not appreciate any of the unique qualities or unique problems associated with the continuous pasteurization of liquid egg.

U.S. Pat. No. 4,695,472 (the "'472 patent") issued Sep. 22, 1987, discusses methods and apparatus for extending the shelf life of fluid food products including eggs. The methods and apparatus described involve the repeated application of high voltage, high current density, discrete electrical pulses to fluid food products. Field strengths used are, at a minimum, 5,000 volts/cm. Voltages as high as, for example, 37,128 volts are disclosed. Current densities of at least about 12 amps/cm$^2$ are also disclosed as are pulse frequencies of between 0.1 and 100. Preferably, the treatment methods according to the '472 patent involves the application of at least 2 and more preferably at least about 5 high energy pulses to the material being treated. The principal embodiments disclosed in the '472 patent involve the use of direct current.

The techniques described in the '472 patent have several disadvantages. Most notably, electrolysis is caused with resultant electrode loss, contamination of the foodstuffs, and, at least in the case of eggs, detrimental coagulation. To mitigate this problem, the '472 patent requires the use of membranes interspersed between the electrodes and the food product being treated. The '472 patent also fails to appreciate that highly functional egg having outstanding storage stability can be obtained without the need for the complicated pulsed electrical treatment disclosed therein.

The '472 reference also does not appreciate the difficulties attendant the continuous pasteurization of liquid egg. In fact, the '427 patent never describes elevating the temperature of liquid egg, and in particular, liquid whole egg to minimum pasteurization temperatures. Specifically, nothing in the '472 patent discusses the problems attendant ensuring the absence of detrimental coagulation. Even though the '472 patent does describe arcing as a potential problem, the only effect attributed to such arcing is damage to the electrodes. There is no appreciation of the effect of such phenomena on the organoleptic qualities of the egg and the viability of further continuous processing. Furthermore, all of the tests conducted in accordance with the '472 patent of liquid egg involve the use of static, bench testing devices at peak voltages of 34,000 volts or higher and currents ranging from between 7,200 and 14,200 amps. No continuous egg processing was undertaken.

The '472 patent does not describe the use of concentric electrodes or the advantages obtained by their use, nor does it describe the advantageous arrangement of electroheating cells described herein.

U.S. Pat. No. 1,775,579, issued Sep. 9, 1930, describes a milk sterilizing apparatus in the form of concentric electrodes. A tube forms the first electrode of a concentric pair of electrodes with a central rod forming the second. Milk entering the tube is first heated by an immersion heater inserted into one end of the tube to a temperature in the range of about 90° F. to about 100° F. The milk, thus heated, is passed between the tube and the rod electrode through the electric field established between them by an electric supply system at 110 volts. No mention is made of using such a device to pasteurize liquid egg and thus the intricacies of such processing is not appreciated by the inventor thereof. This patent also fails to appreciate the advantages obtained by the arrangement of electrical components described herein.

Geren, U.S. Pat. No. 4,457,221, issued Jul. 3, 1984, shows a three phase sterilization apparatus where three parallel electrodes are arranged in a circular pattern to form three equidistant channels through which materials to be treated are passed. Voltages employed are approximately 100 volts RMS with voltages up to 1000 volts preferred. Current densities are at least 50 milliamperes per square centimeter (ma/cm$^2$) but in practice are between 500 ma/cm$^2$ and 1.25 ampere/cm$^2$. Time of the application of the currents are less than 200 micro-seconds and the frequency is 50 Hz. The device of the '221 is described as an apparatus for sterilizing by killing bacteria and similar organisms in a host which may be either solid or liquid. No mention is made of treating liquid egg nor of the problems encountered in the processing of such material. Furthermore, the unique arrangement of elements of the present invention are neither described nor appreciated.

Bushnell et al., U.S. Pat. No. 5,048,404, issued Sep. 17, 1991, are directed to pulsed high voltage systems for extending the shelf life of pumpable food products which include liquid egg products. The liquid foodstuff is pumped through passages between concentric electrodes and subjected to very high voltage pulses of a very short duration. The liquid foodstuffs are pumped at a rate such that it will be subjected to at least one pulse in the treatment zone and preferably to two pulses. The pulse will have a duration of from 0.01 microseconds to about 10 microseconds at pulsed field strengths in excess of 30 KV/cm, preferably about 35 KV/cm. The overall system shown in FIG. 1 introduces preheated liquid foodstuff at about 104° F. to 122° F. from in line heating unit to the long pathway uniform electric field cell where the liquid foodstuff is heated to about 122° F. to 158° F. The liquid foodstuffs are then cooled to 41° F. to 50° F. and packaged.

Bushnell et al. include in this teaching, the substance of the U.S. Pat. No. 4,695,472 patent which it incorporates by reference, particularly as to the use of a membrane to prevent electrolysis. Although the use of the concentric electrode apparatus upon various pumpable products is described in detail the use of the device with liquid egg is not. In fact, no example of continuous processing of liquid egg, or any coagulable liquid is provided. Since the parameters of the pulsed high voltage system is similar to that of the '472 patent it is believed the problems and difficulties noted above with respect to the '472 patent will also be true of Bushnell et al.

Bushnell et al. neither teach the use of high frequency alternating current to avoid electrolysis nor suggest that high frequency electrical energy could be used to pasteurize liquid egg in a long term continuous process. Bushnell et al. are also silent on whether or not concentric electrodes could work with such high frequency energy in a long term continuous process. Moreover, Bushnell et al. do not appear to teach or suggest electroheating whereby the attainment of pasteurization temperatures is a direct result of the application of certain forms of electrical energy.

Instead, Bushnell et al. suggest the addition of electrical pulse energy to a system otherwise at pasteurization temperatures can provide an effective kill. That is to say, Bushnell et al. do not teach methods of pasteurizing or even heat treating, but rather, producing improved microbial kill. This point is emphasized by the fact that Bushnell et al. do not appear to teach or disclose the use of otherwise necessary pasteurization equipment such as holding tubes.

As anyone of ordinary skill in the art can attest, the use of different types of electrical energy in different types of electrical processes brings with it its own set of advantages, disadvantages, and complications. Because, for example, Bushnell et al. do not use high frequency alternating current as is practiced in accordance with the present invention, they have no appreciation of the problems and advantages associated with its use. For example, current densities of at least about 12 amps/cm$^2$ are disclosed in the '472 patent which is incorporated by reference in Bushnell et al. While such current densities may be possible, in the context of a pulse system when applied to liquid egg, the present inventor believes that such current densities are, even under the most academic conditions, unattainable in the present system. Bushnell et al. fail to appreciate that in a long term electroheating application utilizing continuous application of high frequency AC electric current, too large a current density coagulates egg which can cause it to begin to stick to the surfaces of the electrodes. Caking, arcing and fouling will result shortly thereafter.

The present inventor has learned that, if the electrodes can be cooled efficiently enough, the coagulated egg may not stick to the surface of the electrodes such that one method of controlling, for example, arcing, is the use of very efficient cooling. On the other hand, the application of AC energy with too high a current density can still cause significant and even detrimental coagulation to occur. Of course, by the application of relatively high current densities, and with efficient cooling, it may be possible to coagulate or cook liquid egg. However, if no detrimental coagulation is desirable, as is usually the case for liquid egg, lower current densities must be used even with efficient cooling. The '472 patent and Bushnell et al. exhibit their lack of appreciation of these considerations by failing to even discuss the need for cooling, let alone efficient cooling, or the problems of coagulations which can be brought about by the use of very high current densities during the application of high frequency alternating electric current.

In copending U.S. patent application Ser. No. 07/862,198, filed Apr. 2, 1992 entitled "METHODS AND APPARATUS FOR ELECTROHEATING LIQUID EGG" by David Reznik and Aloysius Knipper, there is described a methodology for the pasteurizing of liquid egg at temperatures which would not otherwise be conveniently available to eliminate pathogenic bacteria without sacrificing the physical characteristics of liquid egg. The electroheating is achieved at a current frequency which is effective to heat the egg without electrolysis or detrimental coagulation. The electroheated liquid egg is hold for a period sufficient to achieve pasteurization and then cooled for packaging or storing.

The electroheating cell of the above identified application contains at least one pair of electrodes having egg engaging surfaces spaced apart from one another to form a gap through which the liquid egg to be pasteurized is passed. The electrodes are generally parallel plate electrodes having highly smooth, non-wetting surfaces and having rounded edges which do not contact the liquid egg being processed through the cell. The surfaces of the electrodes are extremely smooth and difficult to wet or adhere to and thus provide a smooth, unimpeded flow of liquid egg through the cell.

OBJECTS AND SUMMARY OF THE INVENTION

It is an object of the present invention to provide an electroheating apparatus useful in the pasteurization of liquid egg.

It is also an object of the present invention to provide an electroheating apparatus for liquid egg which utilizes concentric electrodes.

It is another object of the present invention to provide for an electroheater for pasteurizing liquid egg wherein the electrodes are adjustable so that the electronic conditions occurring within the electroheating cells can be controlled accurately.

Methods of pasteurizing liquid egg utilizing such electroheating apparatus are also an object of the present invention.

In accordance with one aspect of the present invention, there is provided an electroheating apparatus for use in the continuous heat treatment of liquid egg comprising:

at least one electroheating cell including a first electrode having a generally cylindrical liquid egg engaging inner surface extending from a first end to a second end with an inside diameter of a first predetermined value;

a second electrode having a generally cylindrical liquid egg engaging outer surface extending from a first end to a second end with an outer diameter of a second predetermined value which is less than the first predetermined value;

means for positioning the second electrode inside of the first electrode with the outer surface of the second electrode spaced apart from the inner surface of the first electrode to form a continuous gap therebetween through which liquid egg to be pasteurized is passed;

and a source of high frequency AC electric current having a frequency effective to heat the liquid egg without electrolysis, operably linked to the first and the second electrodes to supply continuous the high frequency AC electric current to the cell.

Also in accordance with the present invention, there is provided an electroheating apparatus as described above, which further includes adjustment means connected to at least one of the first and second electrodes to vary the position of the electrodes with respect to the first electrode and thereby alter the amount of the second electrode surface adjacent the first electrode surface.

In accordance with this aspect of the present invention, control of current density may be accomplished by the use of an electroheater comprised of a plurality of electroheating calls. However, even more accurate fine tuning of current densities may also be required. Therefore, in accordance with the present invention, there is provided an electroheating cell which allows for the accurate and relatively easy adjustment of current density within the cell. Neither the recognition of the desirability of minimizing current density nor the proposal of devices to accomplish this goal are proposed by Bushnell at al.

Also in accordance with another aspect of this invention, provided is a method of pasteurizing liquid egg including the steps of:

providing liquid egg;

passing the liquid egg through an electroheater including at least one electroheating cell, the at least one electroheating cell including a pair of concentric electrodes separated by a gap through which the liquid egg flows;

electroheating the liquid egg by passing high frequency AC electric current across the electrodes and through the liquid egg as the liquid egg passes through the gap between the electrodes;

the high frequency AC electric current having a frequency which is effective to heat the liquid egg substantially without electrolysis;

and holding the electroheated liquid egg for a period of time sufficient to achieve pasteurization.

It is another object of the present invention to provide for an electroheater for food.

It is another object of the present invention to provide an electroheater which is capable of long run times and large temperature increases.

It is another object of the present invention to provide an electroheater for electroheating food which can be used in conjunction with coagulable foods and yet can impart greater run times at greater temperatures that then can be achieved through other conventional heating methods and apparatus.

In accordance with this further aspect of the present invention, there is provided an apparatus for electroheating food including:

an apparatus for electroheating food comprising:

at least one first electroheating cell having a first pair of electrodes separated by a first gap through which food can flow;

at least one second electroheating cell having a second pair of electrodes separated by a second gap through which food can flow and in fluid communication with the first gap;

and a source of AC electric current having a frequency which is effective to electroheat the food without electrolysis operably linked to the at least one first and the at least one second electroheating cells, the source of AC electric current applying a relatively high voltage, relatively low current, high frequency AC electric current across the first pair of electrodes, and the source of AC electric current applying a relatively low voltage, relatively high current, high frequency AC electric current across the second pair of electrodes.

In a particularly preferred embodiment, there is provided an apparatus for electroheating food as described immediately above which further includes the apparatus for electroheating food of claim 32, further comprising at least one third electroheating cell having a third pair of electrodes separated by a third gap through which food can flow, the at least one third electroheating cell being operably linked electronically in parallel with the first electroheating cell and being in fluid communication with at least one of the first or the second electroheating cells such that food can travel from the gap in one electroheating cell to the gap in another electroheating cell, wherein the source of AC electric current applies a relatively high voltage, relatively low current, high frequency AC electric current across the third pair of electrodes.

In another aspect of the present invention, an electroheater described herein includes a food inlet which is in fluid communication with an electroheating cell. The electroheating cell includes a first electrically conductive electrode and a second electrically conductive electrode, each of the electrodes including an aperture through which food can flow. The first and the second electrodes are separated by a hollow insulating member such that food can flow through the apertures of the first electrode into the interior of the hollow insulating member and out through the aperture of the second electrode. The electrodes are linked electrically to a source of high frequency AC electric current having a frequency which is effective to heat the food without electrolysis and the flow of the electric current is parallel to the flow of food. An outlet from the electroheating cell is also provided.

In a more preferred embodiment in accordance with this aspect of the present invention, the electroheater described includes at least one second electroheating cell electrically linked in series with the at least one first electroheating cell and in fluid communication therewith. The at least one first electroheating cell and the at least one second electroheating cell are configured electronically linked in such a way so as to reduce and retard arcing and fouling. Holding tubes, cooling means and packagers as previously described can, of course, be appropriately linked to the outlet of the electroheater just described to allow the electroheater to be used as part of a pasteurization or sterilization system for foods like liquid egg. Of course, a plurality of additional electroheating cells is also contemplated.

In another embodiment of the present invention, the electroheater can be described as an electroheater including:

a first plurality of electroheating cells, the cells being electrically linked in parallel;

a second plurality of electroheating cells, the cells being electrically linked in parallel;

the first plurality of electroheating cells and the second plurality of electroheating cells being electrically linked in series;

and a source of AC electrical current which is applied across each of the electroheating cells.

It is also an object of the present invention to provide methods of heat treating foods by the use of the electroheaters of the present invention.

Therefore, in accordance with a still further aspect of the present invention, there is provided a method of electroheating food including the steps of:

providing food to be electroheated;

passing the food through an electroheater comprising at least one first electroheating cell having a first pair of electrodes separated by a first gap through which the food can flow;

electroheating the food by passing relatively high voltage, relatively low current, high frequency AC electric current across the first pair of electrodes and through the food as the food passes through the first gap;

passing the food through at least one second electroheating cell having a second pair of electrodes separated by a second gap through which the food can flow;

electroheating the food by passing relatively low voltage, relatively high current, high frequency AC electric current across the electrodes and through the liquid egg as the liquid egg passes through the second gap between the second pair of electrodes; the high frequency AC electric current having a frequency which is effective to heat the food without electrolysis.

In accordance with a still further aspect of the present invention, there is also provided hereby methods of killing microbes in food including the steps of:

providing food containing microbes;

passing the food through an electroheater including at least one first electroheating call having a first pair of electrodes separated by a first gap through which the food can flow;

electroheating the food by passing relatively high voltage, relatively low current, high frequency AC electric current across the first pair of electrodes and through the food as the food passes through the first gap;

passing the food through at least one second electroheating cell having a second pair of electrodes separated by a second gap through which the food can flow;

electroheating the food by passing relatively low voltage, relatively high current, high frequency AC electric current across the electrodes and through the liquid egg as the liquid egg passes through the second gap between the second pair of electrodes;

and holding the electroheated food for a time which is sufficient to inactivate or destroy at least a portion of the microbes in the food.

In particular, methods of pasteurizing and methods of sterilizing are contemplated.

BRIEF DESCRIPTION OF THE DRAWINGS

In the drawings in which similar elements are given such reference characters.

DETAILED DESCRIPTION OF THE PREFERRED EMBODIMENTS

Figure 1:
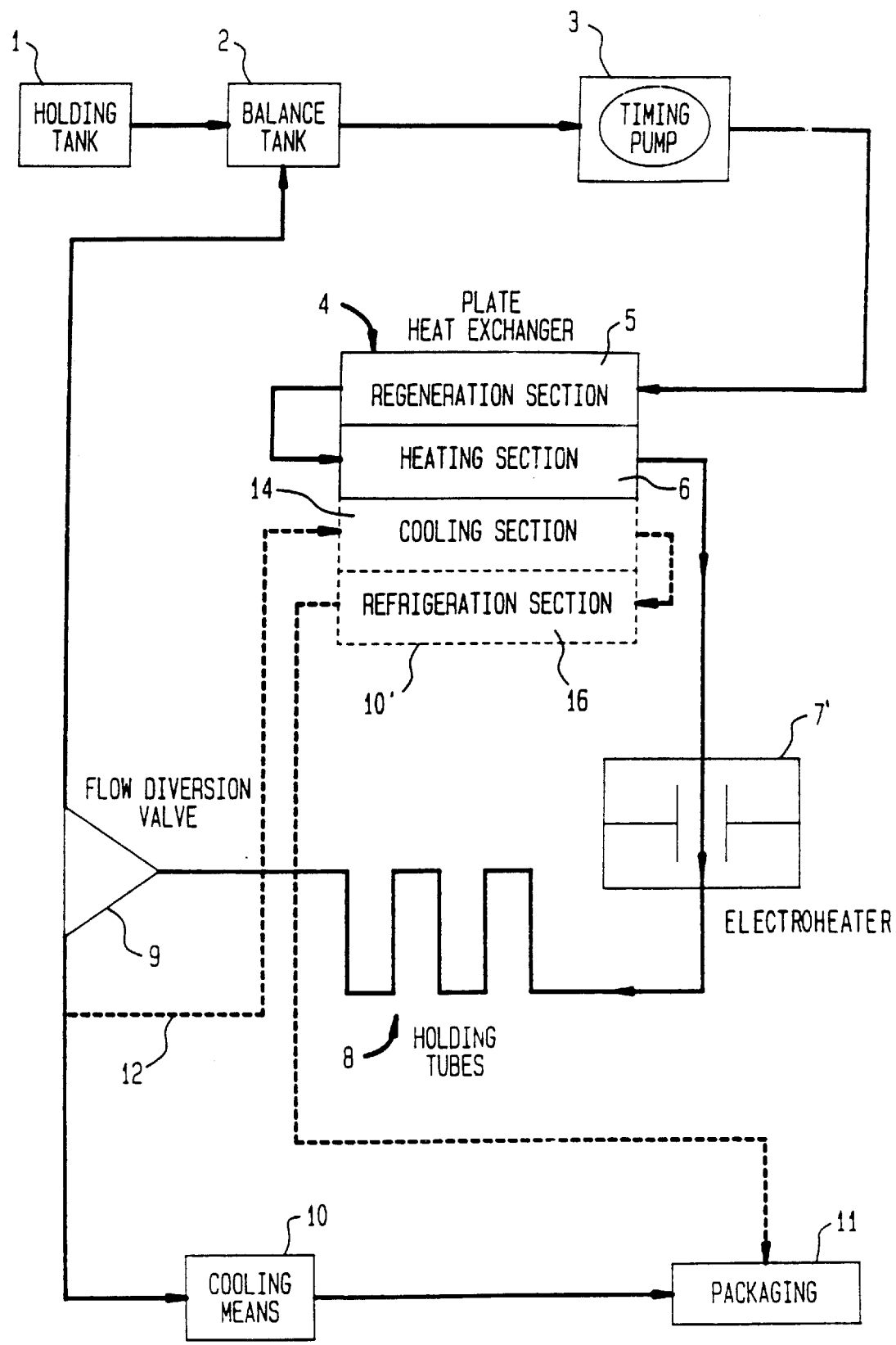
FIG. 1 is a schematic representation of one configuration of an electroheating pasteurization system.

The term "liquid egg" in accordance with the present invention is meant to include not only liquid egg white and liquid egg yolk, but also combinations of each in any predetermined or desirable ratio. The term "liquid egg" also includes liquid egg white, liquid egg yolk, or combinations thereof (referred to as "liquid whole egg") with additives such as salt, sugar, milk, stabilizers, antibiotics, dextrins, cyclodextrins, peroxides, acids such as citric acid and food including solid or particulate foodstuffs. Liquid egg from which cholesterol has been removed is also included.

The term "electroheating" in accordance with the present invention is meant to encompass a process of generating heat in liquid egg by passing a current through the liquid egg. The liquid egg acts as a resistor and heat is generated thereby. A particularly preferred technique for electroheating food is described in U.S. Pat. No. 4,739,140, which has previously been incorporated by reference. In electroheating, the electrodes do not get hot as a result of the flow of current. In fact, in a disclosed embodiment, affirmative steps are taken to ensure that the electrodes do not get hot. The only heat used to raise the temperature of the liquid egg or other food to pasteurization or treatment temperatures is generated within the food itself.

As used herein, the terms "pasteurization", "pasteurize" and "pasteurized" refer to the killing of sufficient pathogenic microorganisms contained within food and in particular liquid egg so as to render the food edible without threat of, for example, salmonella infection. "Pasteurization" may also be thought of as a treatment which is designed to eliminate, for all practical purposes, pathogenic microorganisms and, in particular, salmonella, and, secondarily, to reduce the number of spoilage microorganisms present to improve the keeping quality of the food product. At U.S.D.A. minimum time and temperature parameters, pasteurization will generally produce liquid egg which will have a refrigerated shelf life of between about 7 and about 14 days. For liquid whole egg, a minimum temperature of 140° F. and minimum holding time of 3.5 minutes is required. The definition of pasteurization, in terms of attained temperatures and holding times, for other foods is generally provided by government regulation and industry standards. They are therefore readily acceptable. "Sterilization" in accordance with the present invention generally refers to a condition where all microbes, whether in an active or vegetative state, including spores, are destroyed. The conditions for sterilization of various foods are also prescribed by government regulation and industry standard.

"Extended refrigerated shelf life" means that the liquid egg is safe to consume for a period of at least 3 weeks after treatment in accordance with the present invention. This, of course, assumes proper refrigerated storage. Preferably, the term "extended refrigerated shelf life" means that the liquid egg is safe to consume for a period of at least 4 weeks after treatment in accordance with the present invention and more often 10 to 12 weeks after treatment, or longer. An extended refrigerated shelf life can also be imparted to other perishable foods by the practice of the present invention.

"Electrolysis" refers to a chemical process which can take one of at least two forms. One form of electrolysis results in the dissolution of the metal electrodes inserted into the food being treated. As electrons flow between the pair of electrodes, the metal within the electrodes becomes ionized, thereby releasing electrons. The ions are soluble and dissolve into the food being treated. Another electrolytic problem is caused by the conversion of conductive ionic species within the food being treated to radicals and gases, such as the conversion of a hydrogen ion to hydrogen gas and chlorine ions to chlorine gas. Hydroxide ions can subsequently be converted to water and oxygen. This conversion can adversely impact the flavor and other advantageous qualities of the treated food both as a result of the direct depletion of ions and their conversion to other species and by initiating other reactions within the food such as oxidation.

Coagulation generally involves the denaturation and agglomeration of protein contained in a food. Some foods, like, orange juice, do not coagulate when heated. Other foods, such as liquid egg, do coagulate when a sufficient amount of energy is applied.

In accordance with the present invention as it relates to liquid egg and other coagulable foods, coagulation is usually to be minimized. At pasteurization temperatures, for liquid egg, some degree of coagulation will occur. However, in accordance with the present invention, and unless the liquid egg is to be cooked, "detrimental coagulation" should be prevented. Detrimental coagulation is an increase in the viscosity of the liquid food such that its smooth pourable nature is compromised. Its functionality is also compromised at this point and visible particles of egg appear.

The methods and apparatus of the present invention will be better understood with reference to the schematic diagram of FIG. 1, which describes a typical device used for pasteurizing liquid egg products. This typical egg pasteurizer has, however, been modified by substitution of an electroheater 7' where a plate heat exchanger or other conventional heating device could be used. This and similar devices can also be used in connection with the heat treatment of a wide variety of foods.

Food, and for illustrative purposes only, liquid whole egg, usually in refrigerated form, is transferred from a holding tank 1 to a balance tank 2. Liquid egg could also be introduced into the apparatus directly from a tank car, tank truck or from an egg breaking line. Thereafter, the liquid whole egg is pumped through a timing pump 3 which keeps the liquid whole egg moving throughout the entire pasteurization apparatus. The liquid whole egg is then preferably preheated by any conventional means of heating such as ovens, vats and/or steam infusion systems. In addition, electroheating elements or cells of the present invention can also be used to preheat the liquid whole egg. The liquid whole egg is usually brought from refrigerated or room temperature up to about 139° F. or higher. More preferably, however, a conventional plate heat exchanger 4 is used to accomplish preheating.

As shown in FIG. 1, the regeneration section 5 of a conventional plate heat exchanger 4 is connected to the output of timing pump 3. The liquid whole egg temperature is raised in the regeneration section 5 from, for example, 35°–40° F. to between about 90° F. and about 120° F. Thereafter, the liquid whole egg is introduced into the heating section 6 of plate heat exchanger 4 for further preheating. In heating section 6 the temperature of the liquid whole egg is further elevated in temperature to something below pasteurization temperature, usually between about 120° F. and about 149° F. In a preferred embodiment, preheating temperatures of about 123° F. and about 149° F. and more preferably between about 130° F. and about 144° F. are used for liquid whole egg. Unless relatively high pasteurization temperatures are used, it is generally preferable that the maximum preheating temperature be selected such that it is below the pasteurization temperature of the particular form of food being treated. In the context of liquid whole egg, preheating temperatures generally range up to about 139° F.

Thereafter, the liquid whole egg passes between the electrodes of an electroheater 7'. The electroheater 7' is supplied with a high frequency AC electric current which is effective to heat the liquid whole egg without electrolysis. This energy is applied to the liquid whole egg in such a way so as to avoid detrimental coagulation. In electroheater 7' the temperature of the liquid whole egg is elevated from its preheated temperature to the desired pasteurizing temperature. Pasteurization temperatures in excess of 170° F. for liquid whole egg can be achieved, however, preferred pasteurization temperatures of between about 140° F. and about 165° F. and more preferably, between about 140° F. and about 155° F. are achieved. Most preferably, pasteurization temperatures between about 140° F. about 145° F. are used. These temperatures are, of course, for liquid whole egg only. For liquid egg white, temperatures should range from between about 124° F. (with peroxide) or about 134° F. (without peroxide) to about 139° F.

After being electroheated, the liquid whole egg is then passed through holding tubes 8 where it is held for a period of time sufficient to complete pasteurization in accordance with the Federal Regulations. Generally, holding times of between about 0.1 seconds and about 5 minutes can be used, however, times of between about 2 and about 4 minutes are preferred. The liquid whole egg then passes to flow diversion valve 9. If the temperature of the liquid whole egg exiting holding tubes 8 is below a preset value the liquid whole egg is returned to the balance tank 2 to go through another pasteurization pass. If, however, the exit temperature is at or above the preset value, the liquid whole egg is allowed to proceed via the cooling means 10 to the packager 11, or to a holding tank, tank car, etc. When cooled by cooling means 10, the pasteurized electroheated liquid whole egg preferably returns to a refrigerated temperature of between about 32° F. and 45° F.

Cooling means 10 can be any device useful for lowering the temperature of the electroheated liquid egg, liquid whole egg in this case, quickly enough to avoid detrimental coagulation. When high temperatures, and in particular, temperatures over about 155° F. to 160° F. and higher are reached during pasteurization, the need to rapidly cool the liquid whole egg becomes acute. In such cases it may be necessary to utilize a "Y"-shaped cooling device such as described in the aforementioned U.S. patent application Ser. No. 07/862,198, filed on Apr. 2, 1992.

When, however, pasteurization temperatures are below 160° F. and more particularly below 155° F., it is acceptable to use more conventional cooling means 10' such as the cooling/regeneration section and refrigeration section of a conventional plate heat exchanger. In fact, cooling means 10' may be the cooling/regeneration and refrigeration sections 14 and 16 respectively, of plate heat exchanger 4, as shown in dashed lines in FIG. 1. In that case, after leaving flow diversion valve 9, the electroheated liquid whole egg would flow into the cooling/regeneration section 14 of plate heat exchanger 4 via conduit or pipe 12 where its temperature would be lowered to between about 120° F. and about 60° F. Thereafter, the cooled liquid whole egg would be refrigerated in the refrigeration section 16 of heat exchanger 4 where its temperature would be lowered to between about 32° F. and about 45° F. and, more preferably, between about 32° F. and about 40° F. Thereafter, the refrigerated liquid whole egg could be stored, loaded into a tank car or truck or packaged in packaging device or packager 11.

Packaging device 11 need not be aseptic. By electroheating and storage at 40° F. or under, it is not necessary to aseptically package processed pasteurized liquid egg in order to obtain an extended refrigerated shelf life and, more particularly, an extended refrigerated shelf life of eight weeks or more. Aseptic packaging procedures are described in 21 C.F.R. §§ 113.3, 114.40(g) and 113.100(a)(4). Generally during aseptic processing, a commercially sterilized product is introduced into a sterile package under sterile conditions such that the filling and sealing of the package is all conducted in a sterile environment. Of course, liquid egg in accordance with the present invention and the majority of known technology is not sterile. Nonetheless, Aseptic packaging procedures insure that a statistically insignificant number of cells are introduced during packaging. For purposes of illustration only, aseptic packaging should introduce approximately one cell per 1,000,000 packages. Aseptic packaging can be accomplished using an International Paper Model SA aseptic packager or a Scholle Model 10-2E aseptic packager. Of course, aseptic packaging may be utilized in accordance with the present invention. However, because of the present invention, it need not be.

Another type of packaging useful in accordance with the present invention is the so-called "clean pack" which may be produced using a Cherry-Burrell packager Model EQ3 or EQ4. This type of packaging has a higher failure rate or, more correctly put, a higher incidence of the introduction of microorganisms during packaging than a truly aseptic system. For illustration purposes only, a clean pack may introduce one cell per every 100,000 packages. While the use of this packaging technology does not qualify as aseptic, it is certainly acceptable in terms of the present invention and such devices may be used as packaging device 11. These Cherry-Burrell packages can also be run so as to produce plain sanitized clean containers as discussed below. For example, if the packages are not treated with a peroxide spray prior to filling, they can be considered sanitized, but not aseptic or "clean packs." These are both forms of extended refrigerated shelf life packages.

Also useful in accordance with the present invention are plain sanitized clean containers produced and sanitized using "good manufacturing procedures" in accordance with all government regulations. Such containers which have been properly sanitized may introduce as many as, for illustration purposes only, one cell per hundred packages. Because of the superior kill provided by electroheating and the growth inhibitory effect of proper refrigerated storage, such an addition of cells is not considered significant.

These aforementioned packages, which are all specifically useful in practicing the present invention to provide extended shelf life, may be contrasted with a "dirty package" which has not been sanitized nor packaged under clean or aseptic conditions. Such containers may introduce 1,000 cells per package or more which is statistically significant relative to the number of cells remaining in pasteurized liquid egg after successful pasteurization. Of course, any other type of package can be utilized, as individual customers may require. With this overview in mind, the various aspects of the present invention will now be described.

What follows is an explanation of the structure and function of various electroheaters 7' in accordance with the present invention. To aid in the understanding of the organization and operation of these electroheaters 7', it is advantageous to provide a set of working electrical parameters and structural dimensions to use for illustration purposes only. It will be understood, of course, that the practice of the present invention is in no way limited thereto. For the purposes of this illustration, a Westinghouse model 125K67 RF generator is used generating about 3200 volts peak to peak and about 400 amps. All voltages reported are peak to peak. This particular generator automatically adjusted the voltage in an attempt to keep the current constant. Current densities of greater than 6 amps/cm$^2$, for example, are about the maximum obtainable in the practice of the present invention under normal circumstances. Preferably, in accordance with the present invention, and particularly when liquid egg having no detrimental coagulation is sought, current densities used are maintained at about 3 amps/cm$^2$ or less and preferably, at or below 1 amp/cm$^2$. The current densities applied through the various electrodes described in this illustration are at or below about 2 amps/cm$^2$. The RF generator is capable of producing high frequency AC current including frequencies which are high enough to prevent electrolysis of the food lying between approximately 100 Hz and 450 kHz. More preferably, high frequency in accordance with the present invention means the use of voltages having a frequency of between about 100 kHz and 450 kHz and more preferably between about 150 kHz and 450 kHz. For illustration purposes, a frequency of between about 180 and about 220 kHz was used. Also for purposes of this explanation, liquid whole egg sold under the name "Table Ready" from Papetti's Hygrade Egg Products, Inc., Elizabeth, N.J., will be described. Table Ready brand liquid whole egg includes citric acid in an amount necessary to stabilize the color of the egg yolk. Flow rates of between about 380–400 pounds per minute are contemplated for purposes of the present illustration.

Figure 2:
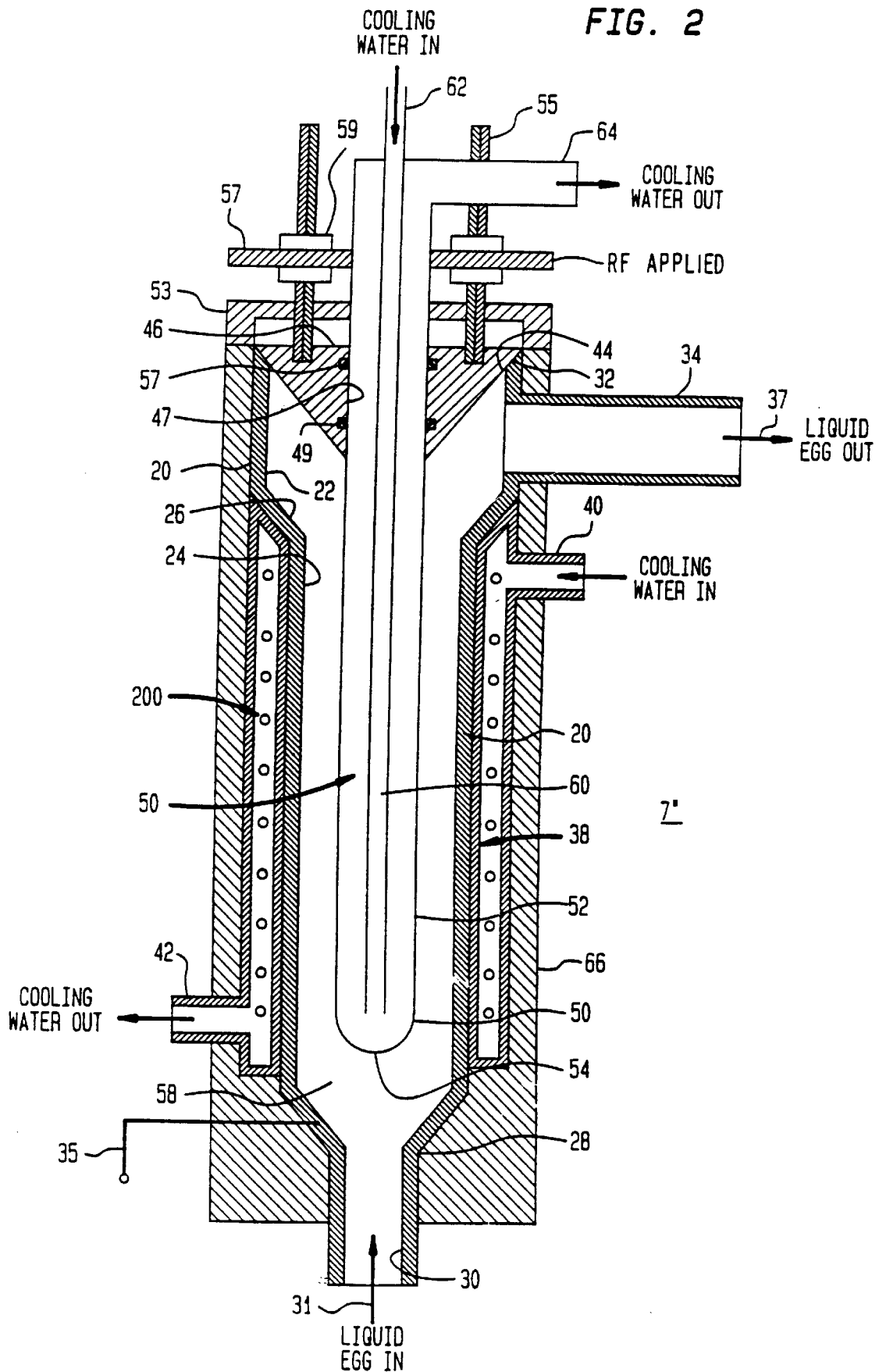
FIG. 2 is a side elevational view, in section, of a concentric electrode electroheating element constructed in accordance with the concepts of the invention.
Figure 3:
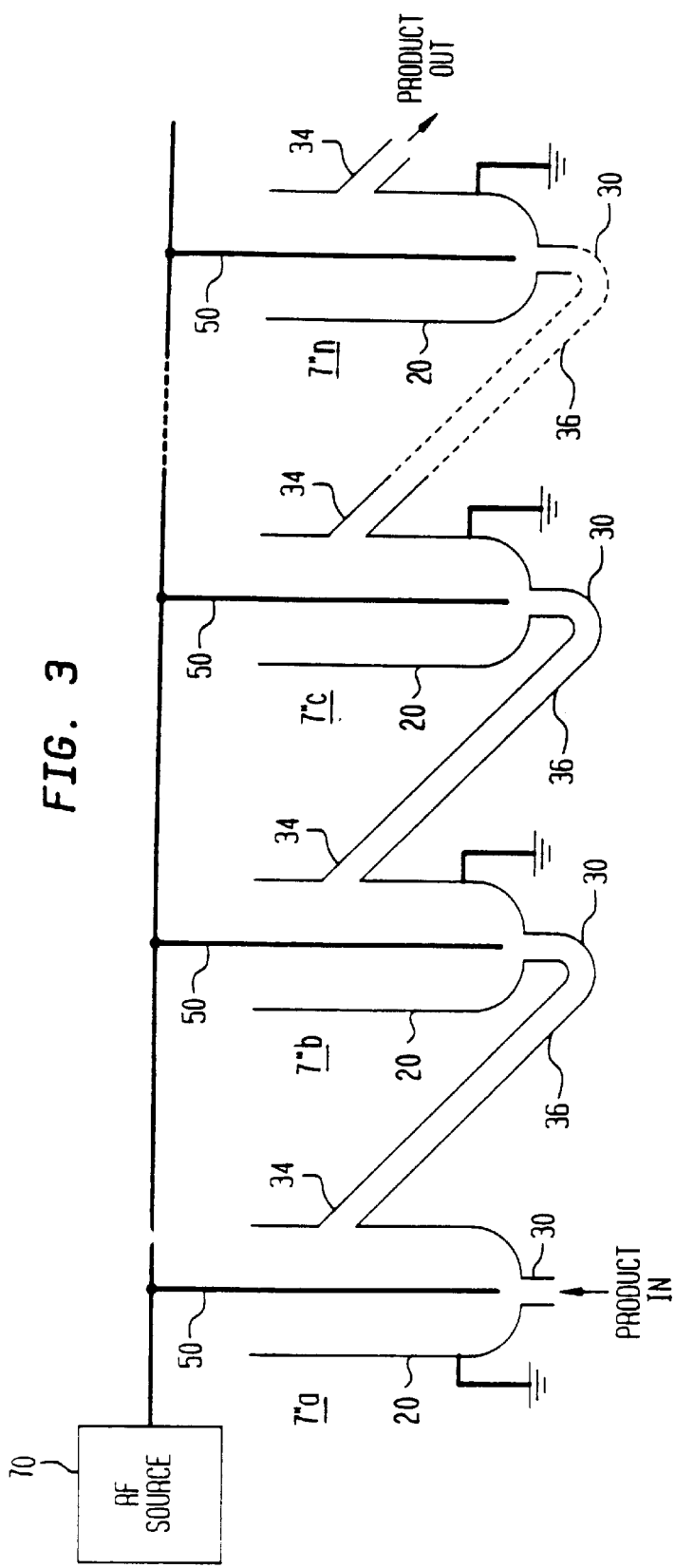
FIG. 3 is a schematic representation of the manner in which a number of the elements of FIG. 2 can be combined to produce a multi-step device.
Figure 4:
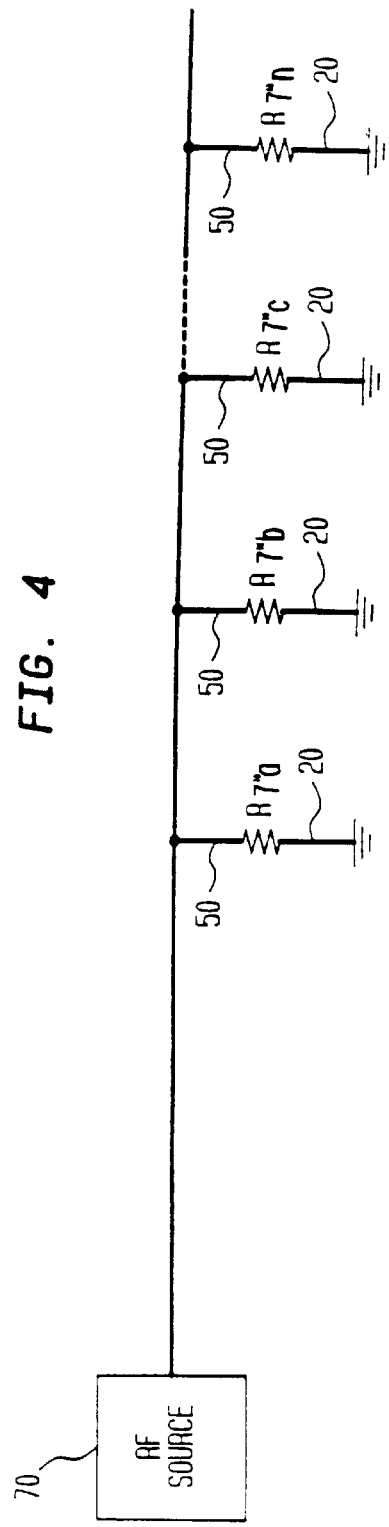
FIG. 4 is a schematic drawing of the equivalent circuit of FIG. 3.

Turning now to FIGS. 2 to 4, a concentric electrode containing electroheater 7' constructed in accordance with one aspect of the present invention is shown. As is shown in FIG. 2, electroheating cell 7" is made up of a body 20 which may be stainless steel or other metals that will not react with food and which will conduct electricity. The body 20 is generally metallic for strength but can be made up of other materials that conduct electricity and can act as an electrode such as conductive ceramics, conductive porcelain, or insulative materials with a conductive coating such as a semiconductive glaze, etc. Body 20 is the first electrode of the concentric electrode pair included in electroheating call 7". In a particularly preferred configuration, body 20 has a first cylindrical portion 22 and a second cylindrical portion 24 of a lesser outer diameter connected to the first cylindrical portion 22 by a tapered section 26. At the free end 28 of cylindrical portion 24 is an inlet tube 30 through which food may be introduced in the direction of arrow 31 into the gap between the electrodes as will be more fully described below. Adjacent the opposite free end 32 of the cylindrical portion 22 is an outlet tube 34 through which the electroheated food may exit in the direction of arrow 37 to holding tubes 8 or to further electroheating cells 7" as is shown in FIG. 3. The outlet tube 34 of the leftmost electroheating cell 7"a is connected to the electroheating cell 7"b at inlet tube 30 thereof by means of suitable tubes or piping 36.

A cylindrical cooling jacket 38 can be placed about cylindrical portion 24 of body 20. An inlet tube 40 is provided to the cooling jacket 38 at the upper end of cylindrical portion 24 adjacent tapered portion 26 and an outlet tube 42 is provided adjacent the free end 28 of cylindrical portion 24. Fluids such as cold liquids (water, glycol or alcohol) or cooled gases may be circulated through cooling jacket 38 to help conduct away heat generated by the electroheating carried out within the cell 7" or due to the temperature of the food in cell 7" as explained herein.

In a preferred embodiment, baffles or flow diverters can be placed in the lumen or interior of the cooling jacket 38 to help insure the smooth flow of cooling liquids from the inlet tube 40 to the outlet tube 42. The use of flow diverters also helps insure an even cooling over the entire surface of the outer electrodes cylindrical portion 24. As illustrated in FIG. 2, a spring or coil 200 can be placed in the interior of the cooling jacket 38 surrounding cylindrical portion 24. Coil 200 need not form a water tight seal with the interior surfaces of the water jacket 38. However, it is preferred that the spring 200 be such that the majority of the water flows between successive coils thereof. Spring 200 can be made of any suitable material such as, for example, plastic, metal such as copper, aluminum and stainless steel, and the like. Alternatively, the flow of water into the jacket through inlet tube 40 can be increased, insuring the same results.

If desired, a jacket 66 of insulation or other protective of these materials may be placed outside of body 20 and cooling jacket 38 to prevent heat or cooling loss and/or to protect nearby operators.

Also placed in free end 32 of cylindrical portion 22 is an aperture 44 into which is fitted an insulator 46 which may be made of non-tracking materials of rubber, ceramics or plastic. In a preferred embodiment, the insulator 46 is made of DELRIN, a polyacetate homopolymer available from DuPont or CELCON, an acetyl copolymer available from Celanese Corporation.

Insulator 46 contains a central aperture 47 into which is placed the second or central electrode 50. A series of O-rings such as 49 and 51 are disposed in central aperture 47 which engage the outer surface of central electrode 50 when it is placed in aperture 47 of insulator 46 to prevent the passage of the liquid egg out of cell 7" along the outside of central electrode 50 or the passage of external contaminants into the cell 7" by the same route. Pitted above insulator 46 about the free end 32 of cylindrical portion 22 is a hollow cap 53. Two threaded studs 55 are anchored in insulator 46 at one end and exit via corresponding apertures in cap 53. The threaded studs 55 pass through corresponding apertures in a support plate 57. Adjustment nuts 59 are placed on the threaded studs 55 on adjacent both surfaces of support plate 57. The entire central electrode 50 can be moved upwardly within hollow cap 53 by tightening up on adjustment nuts 59 above the support plate 57, while the ones below plate 57 limit the extent of upward movement. By loosening the nuts 59 above plate 57 the entire central electrode 50 can be lowered into body 20 limited by the inclined shape of the insulator 46 itself.

The central electrode 50 is fabricated of stainless steel or other metals with which the food will not react or wet. Electrode 50 can also be fabricated of non-metallic but otherwise conductive and non-reactive materials. Central electrode 50 may be made up of a central tube 52 with a rounded distal end 54 giving the general appearance of a test tube. A source of RF energy is connected to tube 52 via the support plate 57 which is electrically connected to each of the central electrodes 50 of each of the cells 7" of electroheater 7' so that the central electrodes 50 can act as the second electrode of the electroheating device.

A tube 60 is inserted into tube 52 so that its distal end is short of the distal end 54 of tube 52. A source of cooling fluid as previously described is connected to inlet 62 of tube 60 and allowed to flow out into tube 52 and are removed at outlet 64 at the opposite end of tube 52 from distal end 54.

A source of high frequency alternating current 70 (shown in FIG. 3) is coupled to electrode 50 either directly or through a matching coil or tuning coil (not shown). The coil is, however, optional. For illustrative purposes only, five concentric electrodes as described above were interconnected as illustrated in FIG. 3. Twelve inches of electrode 50 were exposed and electrode 50 is 1" in diameter. Body 20 is 14" long and vertically tapering from the widest point of about 30" to the narrowest point of about 2". This produces an electrode having essentially a 12" electroheating zone. The length of this electroheating zone is, in general, dictated by the amount of electrode so exposed within the cavity of body 20. The gap between electrode 50 and electrode 20 is approximately ¾". So configured, applied voltages in the range of about 3200 volts applied to the RF input point on support plate 57 will develop a voltage drop of about 200 volts across the gap between electrodes 20 and 50 and a measurable voltage of 3000 volts at terminal 35.

Electroheating produces heat in the liquid whole egg based upon the resistance it offers to the flow of current therethrough, also termed resistivity. The resistivity of the food can be altered by adding salts, etc., or by adding water or other liquids. Resistivity can also be adjusted by changing the dimensions and relative spacing of the electrodes in accordance with the present invention.

The electrodes themselves should not provide any direct heating. In fact, the concentric electrodes are generally heated because of their contact with the hot food. To control the degree of heating in each cell 7" of electroheater 7', it is preferred to cool the electrodes so as to absorb some or all of the heat produced in the electrodes due to the electroheating. Under desired operating conditions the electrodes are no higher in temperature than the food flowing through the cells 7" and preferably at one or more degrees below the food's temperature. Maintaining the electrodes at such temperatures prevents sticking of foods and, in particular, liquid egg, to the electrodes, as well as caking and undesired coagulation. For the purposes of illustration, the cooling medium was tap water maintained at a temperature of about 5° F. below the maximum liquid whole egg temperature.

It is generally understood that the gradual heating of the liquid egg to its pasteurizing temperature will minimize changes to the physical characteristics of the liquid egg and prevent detrimental coagulation. Therefore, electroheater 7' will generally include a series of cells 7" each including successive pairs of electrodes. The energy transferred to the food is thereby broken into discrete portions as it is applied, in part, through each pair of electrodes in each cell 7". The amount of energy exposure at each element is accordingly reduced. The number of pairs of electrodes is only dictated by the amount of energy to be applied, the degree of temperature change and the general reaction of a particular food to the application of various levels of energy over various periods of time. Generally, the individual calls 7' will raise the temperature of the liquid egg between about 0.1° F. and 10° F. As few as one and as many as 10 cells 7" are useful, but more may be appropriate under certain conditions.

The use of a greater number of cells 7" also decreases the current density applied to the food in a given cell. This is, therefore, one way in accordance with the present invention to control current density.

The addition or removal of cells 7" is but one way to adjust current density. It is a gross method as the addition or subtraction of a cell including electrodes of a predefined surface area will have a predefined effect on current density. If the desired current density is between that obtained by using, for example, 4 and 5 electroheating cells 7", then another way of adjusting current density must be sought, or a number of cells each having electrodes of varying surface area must be on hand. To alleviate this situation, the present invention provides for a cell 7" that has an adjustable electrode surface area and, therefore, an adjustable current density.

Electrode 50 of electroheating cell 7" is adjustable in terms of the amount thereof inserted into the cavity of body 20. By raising electrode 50, e.g. partially withdrawing it from the interior of cell 7", the total effective surface area of the electrodes is reduced. The current density is thereby increased. Conversely, electrode 50 can be further inserted into the cavity of body 20. This increases the total surface area of the electrodes and reduces the effective current density in cell 7". For purposes of the present discussion, electrode 50 was inserted such that 12" thereof was exposed.

The adjustable nature of the electrodes of the present invention also has advantages in terms of providing a uniform current within successive electroheating cells 7". It has been observed that the relative resistivity of liquid egg decreases as its temperature increases at least at about pasteurization temperatures. This may be due to some direct effect of temperature or it may be due to coagulation. Of course, while one of the primary objectives of the present invention is the pasteurization of liquid egg without detrimental coagulation, it is widely recognized that at any pasteurization temperature, at least some level of coagulation will occur. In either event, liquid egg traveling from one electroheating cell 7" to the next will likely exhibit some change in resistivity/conductivity. As the resistance of the liquid egg decreases, the amount of current that can pass therethrough increases and the amount of heating conducted in that particular cell decreases. By adjusting the relative positions of electrodes 20 and 50, the current going through each cell can also be adjusted to compensate for the change in resistivity of the egg. Therefore, a plurality of interlinked electroheating cells 7' can be provided which provide truly uniform heating.

The schematic equivalent circuits for the FIG. 3 are shown in FIG. 4. RF source 70 is connected to each of the central electrodes 50 and the second electrode, body 20, is connected to ground. The resistors $R_{7"a}$, $R_{7"b}$, $R_{7"c}$ ... $R_{7"n}$ represent the resistance to the flow of current in each of the cells $7"a$, $7"b$, $7"c$, ... and $7"n$. While these electrodes are linked in parallel, the actual voltage applied at each electrode 50 may be different because of the inductance and resistance of the copper pipe used to transmit power from the common input. For reasons which are unknown to the inventor, but which are widely known to those of ordinary skill in the art, such behavior is normal when using high frequency AC electrical energy and, in particular, RF.

Specific electroheating systems may have a number of limitations, particularly in the amount of energy that can be imparted through a given area for a given period of time. Once the limits of the system are exceeded, arcing and other disruptive and destructive processes may take place, reducing the efficiency of the device and rendering food products treated thereby unsalable. The system as described immediately above, including a plurality of concentric electrodes can, for example, produced temperature changes of approximately 4° F. in liquid egg for close to commercially viable periods up to about four hours. However, in and of themselves, the electrodes so configured could not be used to provide higher temperature changes without attendant decrease in run time. Eventually, liquid egg would begin to build up on the electrode and the electrical properties at that point would begin to change rapidly. Arcing and other detrimental electrical phenomena would usually follow quickly, requiring shutdown of the apparatus. In addition, food products treated at that time would often have objectionable odor or other properties which rendered them unsalable.

In an attempt to alleviate these problems and to provide an electroheating device using high frequency alternating electric current which could provide greater changes in temperature over longer periods of time, a number of experimental electrode constructs were employed. During this research, the inventor discovered that if two different types of electrodes were properly electrically and operably linked, a system which is actually self-compensating and resistant to arcing results.

It has been discovered that certain arrangements and certain types of electrodes and the use of certain types of energy, when taken in combination, provide very effective devices for electroheating. These devices are characterized by long run times and the ability to impart relatively large increases in temperature. In fact, these attributes are realized even with such difficult to process foods as liquid egg. In one sense, the present inventor has discovered that a plurality of electrodes linked together in parallel are very stable in terms of arcing. As previously described, the current density applied to foods and the degree of current applied is spread out over each set of electrodes. When two such collections of parallel linked electrodes are themselves linked together in series, long run times and high temperature increases result.

This is particularly true where one set of electrodes applies a relatively high voltage, relatively low current to the food being treated and the other set of electrodes, linked in series to the first set of electrodes, electroheats the food by the application of relatively high current, relatively low voltage. The order of this heating is not important.

It was also discovered that when at least one relatively high voltage, relatively low current electrode cell, where the flow of electrical energy is parallel to the flow of food being treated, is operably linked to at least one relatively low voltage, relatively high current electrode cell, where the electrical energy runs across the flow of the food being treated, an interesting relationship was developed. Because of this unique interrelationship, conditions which would otherwise lead to arcing or fouling in other electroheating systems would not compromise long run times and slight changes in temperature. In short, the resulting system is actually arcing and fouling resistant. Long run times and relatively high temperature changes were realized. For example, with the system described herein, liquid whole egg could be processed for longer times than usually associated with plate heat exchangers with a change in temperature of up to about 12° F. Liquid egg to which salt had been added could attain temperatures of up to 18° F. and a caustic cleaning solution exhibited temperature increases of over 20° F.

It is difficult to overstate the unexpected nature of these results. When an electrically identical system was used in connection with concentric electrodes as formerly described herein, a 4° F. rise in temperature for up to about four hours is all that could be achieved. However, under identical electrical conditions, the use of an electroheater 7' including two different types of electrode cells in accordance with this latter aspect of the present invention yielded a 200% increase in attainable temperature and up to a 200% increase in process run time, or greater. What makes these facts even more surprising is that, as described in more detail herein, the application of the relatively low voltage, relatively high current, i.e., where the electrical energy runs across the flow of the food being treated, can be achieved using the very same concentric electrodes described above.

Of course, if either the concentric electrodes described above or the combination of electrodes described hereinafter were utilized in connection with some other power source, a more efficient cooling system, or even a different flow rate, the times and temperatures attainable might vary greatly. However, the relative benefits attained by the use of these different electroheaters 7' in accordance herewith would remain unchanged.

A particularly advantageous electrode has also been discovered whereby a substantial amount of heat can be imparted to food, but which is extremely resistant to arcing and fouling. This electrode, referred to herein as a sight glass electrode, is preferably used to deliver relatively high voltage, relatively low current high frequency AC electric energy, whereby the flow of current is parallel to the flow of the food therethrough. Of course, this electrode could also be used in connection with the application of relatively high current, relatively low voltage electric energy as well. In fact, an electroheater comprising only such sight glass electrodes is contemplated.

For simplicity, this aspect of the present invention will now be described in connection with an electroheater 7' which utilizes five concentric electrodes as previously described, linked in parallel and two sight glass electrodes also linked in parallel. The two sets of electrodes are operably linked to one another in series. Furthermore, the sight glass electrodes in accordance with this explanation will provide relatively high voltage and low current while the concentric electrodes will provide relatively high current and relatively low voltage. Other configurations as described above are, of course, contemplated herein.

Any form of electrode which can meet one of the aforementioned criteria can be used in accordance with this aspect of the present invention. For example, concentric or flat plate type electrodes can be used for the application of relatively low voltage, relatively high current, or relatively low current, relatively high voltage in a direction transverse to the flow of liquid food. Similarly, a pair of electrodes described in U.S. Pat. No. 4,959,525, the entirety of which is hereby incorporated by reference, or a sight glass electrode cell as described herein can be used as a cell in which the electric current flows in the direction of the flow of the food being processed. It should be understood that when the terms "relatively high voltage" or "relatively low voltage" electrodes or electroheating cells are used, it is the degree of voltage drop that is being referenced. A relatively high voltage electrode cell includes electrodes which will exhibit a relatively high voltage drop. The sight glass electrode cells described herein, for example, exhibit a voltage drop of about 3000 volts peak to peak, under illustrated conditions. These cells are considered relatively high voltage electrode cells. By relatively higher or relatively lower as used herein, it should be understood that the relatively high voltage drops realized in the sight glass electrode calls should always be at least larger than the voltage drops applied across, for example, the concentric electrodes of electroheating cells 7". By relatively low current, it is understood that the amperage applied across sight glass electrode cells should always be at least less than the current applied across concentric electrode containing electroheating cells 7". The reverse is also true.

Figure 5:
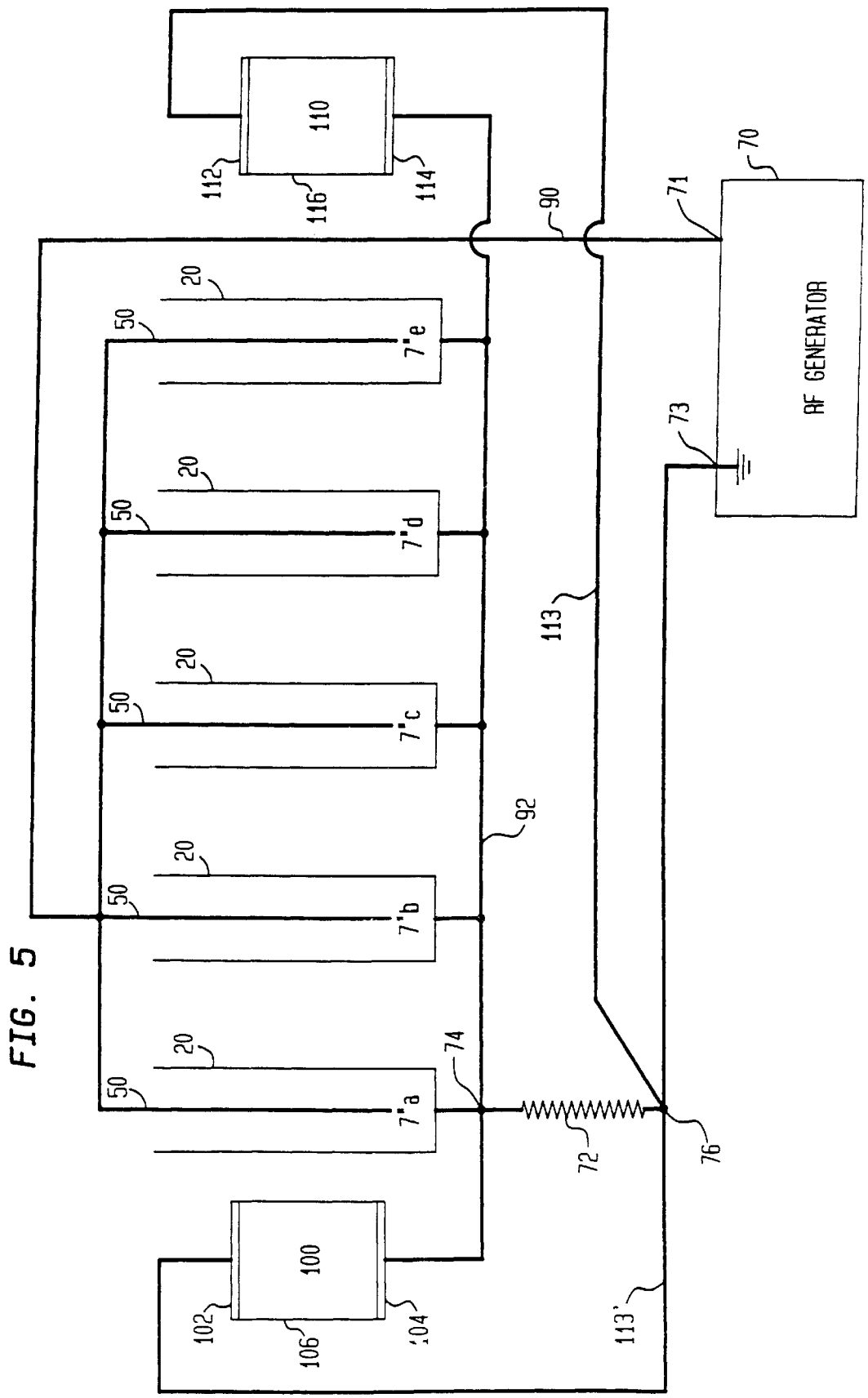
FIG. 5 is a simplified schematic drawing of the device of FIG. 6.
Figure 6:
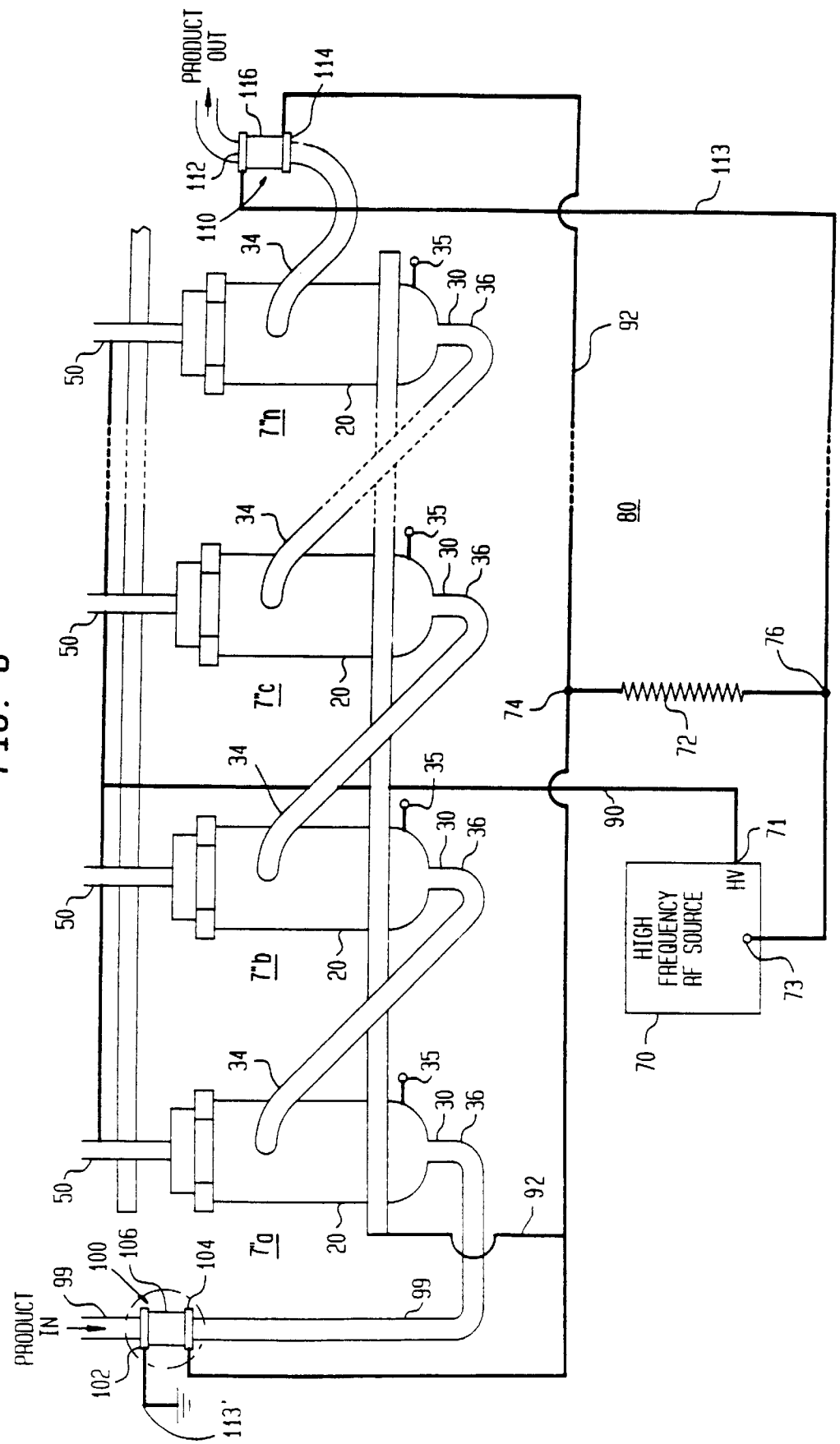
FIG. 6 is a somewhat schematic flow chart of a multi-step electroheating device according to the concepts of the instant invention with changes to the electrical circuit of FIG. 3.

An exemplary electroheating system of this type is described below and is illustrated in FIGS. 5 and 6. Turning first to FIG. 6, there is shown an alternative arrangement 80 of a multi-cell electroheater 7'. This particular electroheater 7' includes a plurality of sight glass electrode cells. Sight glass electrode cell 100 is added at the product input line 99 to the first electroheating cell 7"a of electroheater 7'. The sight glass electrode cell 100 includes metallic end plates or conductive collars 102 and 104 separated by an insulative glass tube 106 of appropriate length, diameter and bore. The end plates 102 and 104 act as electrodes and current passes between them against and parallel to the flow of food as explained below. Glass tube 106 may be composed of an insulating glass material such as KIMAX brand heat resistant glass available from Kimble Glass. However, non-conductive materials which are non-wetting, non-reactive and heat resistant may also be used. Similarly, the end plates or collars need not be metal so long as they are conductive, non-wetting, non-reactive and heat resistant. The end plates 102 and 104 include an aperture through which food can pass. In fact, the end plates 102 and 104 are generally just conductive pipe used to carry the liquid egg to and from the tube 106. A collar and seal are used to seat and attach the insulating tube 106.

Food enters electroheater 7' through conduit or input line 99 and it flows into electroheating cell 100. The food flows through the aperture in first electrode or end plate 102 into the interior of the hollow insulating member, glass tube 106. Finally, the food exits sight glass electrode cell 100 by passing through the aperture in end plate 104. End plate 104 is connected to one side 74 of a resistor or tank coil 72. The other side 76 of resistor or tank 72 is connected to the second terminal 73 of high frequency RF power source 70, which is the system ground. End plate 104 is also connected to the output of the concentric electrodes, common return 92, as described herein. End plate 102 is connected to system ground terminal 73 of power source 70 through lead 113'. For discussion purposes only, glass tube 106 has an inside diameter of about 2" and length of about 14".

A second sight glass electrode cell 110 is provided and is constructed in the same manner as sight glass electrode cell 100. This second sight glass electrode cell 110 is in fluid communication with outlet 34 of concentric electrode containing electroheating cell 7"e to receive food electroheated in cell 7"e. Electroheating cell 110 has an end plate 112 connected to the system ground terminal 73 of source 70 via lead 113. End plate 114 is connected to the side 74 of resistor or tank coil 72 and to said common return 92. A second glass tube 116 is disposed between the respective end plates 112 and 114. Each of said end plates or electrodes 112 and 114 have an aperture through which food enters the electroheating cell 110 and exits therefrom, thus exiting electroheater 7. Again for the purposes of illustration only, glass tube 116 has an inside diameter of 2" and a length of 16". The remaining electroheating cells used are the concentric electrode containing cells 7".

In operation, food is electroheated in electroheating cell 100 by the passage of high frequency AC current from end plate 104 to end plate 102. The food then travels through inlet tube 30 into concentric electroheating cell 7"a and between electrodes 20 and 50 thereof. As illustrated in FIG. 6, once the food is electroheated again between electrodes 50 and 20 of electroheating cell 7"a, the liquid food flows through outlet tube 34 thereof which is connected to a second concentric electrode containing electroheating cell 7"b by means of a suitable tube or pipe 36. Concentric electrode containing electroheating cells 7"c, 7"d and 7"e are connected to each other and to electroheating cell 7"b in the same manner that electroheating cell 7"b is connected to electroheating cell 7"a. After being electroheated in concentric electrode containing cell 7"e, the food exits through outlet 34 and then enters into sight glass electrode cell 110 where it is again electroheated. The food then leaves the electroheater through the aperture in electrode 112.

The flow of electric current through the system takes a quite different path. First, high frequency AC electric current leaves RF generator 70 through output 71 and is fed by lead 90 to the five concentric electrode containing parallel electroheating cells 7". The high potential lead 90 is actually introduced directly into electroheating cell 7"b through electrode 50 thereof. Other leads take the energy to each of the other electrodes 50 of electroheating cells 7", respectively. As previously discussed, one would normally expect that the voltage applied at each electrode 50 would be the same. In the case of the illustration, one would expect the voltage to be approximately 3200 volts peak to peak. However, a voltage drop has been observed the further away from high potential lead 90 the energy is directed. Thus at electrode 50 of electroheating cell 7"e, the voltage peak to peak might be, for example, 3100 volts. This number is purely hypothetical. Without wishing to be bound by any particular theory, it is believed that this is due to the inductance of the ½" or ⅝" copper tubing which is used to conduct electric energy to each of the electrodes 50 from lead 90. It is contemplated that such voltage drops are not unusual when using high frequency RF energy.

The average voltage drop across the gap between all electrodes 50 and electrodes 20 is, for example, 200 volts. Thus the voltage read at electrodes 20 should be approximately 3000 volts. The 200 volts drop is transferred to the food as heat. As shown in FIG. 5, the electrical energy remaining after electroheating food in electroheating cells 7" is then transferred to other portions of electroheater 7' by common return 92. In FIG. 5, common return 92 is shown as a lead. In fact, high frequency RF energy can travel along the outer skin of the concentric electrode containing cells 7" and from one cell to another via the pipes or conduits (inlet 99, inlets 30, outlet 34, connecting tube 36, and the like). Common return 92 conveys electric current to each of the sight glass electrodes 100 and 110 through end plates 104 and 114, respectively. Common return 92 is also connected to resistor or tank coil 72 at end 74 thereof which is arranged in series with the sight glass electrodes 100 and 110. Three thousand volts is therefore applied across tank coil 72 and across the sight glass electrodes 100 and 110.

To complete the current flow, the electric energy traverses the gap between end plate 104 and end plate 102 and end plate 114 and end plate 112, respectively, each of which is linked back to system ground 73 via leads 113' and 113, respectively. A second end 76 of resistor or tank coil 72 is also attached to system ground 73. The resistor or tank coil 72, in one embodiment, is a coil of copper tubing. In another embodiment, however, the tank coil or resistor 72 is merely a 20' or 30' long piece of copper tubing (½" to ⅝ outside diameter). Although the copper tubing has a very low resistance, much lower than the resistance of, for example, liquid whole egg in the sight glass electrodes 100 and 110, it has an inductance which provides a sufficient voltage drop. Therefore, a substantial portion of the current of the system returns to system ground 73 through resistor or tank coil 72, thereby bypassing the sight glass electrodes 100 and 110. This explains why the sight glass electrodes described herein are relatively high voltage (3000 volts peak to peak) and relatively low current (approximately 15 amps calculated).

Without wishing to be bound by any particular theory of operation, it is believed that the use of the resistor or tank coil 72 assists in stabilizing the system, much as a third or fourth electrode cell might. In addition, as a resistor in parallel with electroheating cells 100 and 110, the overall resistance of the system is decreased, thereby preventing too much heating from taking place in electroheating cells 100 and 110. By adjusting the length, inductance and/or material of resistor or tank coil 72, the heating and other electrical characteristics of electroheating cells 100 and 110 may be tailored.

As a result of this arrangement the overall device 80 of FIG. 6 appears as two different types of electroheating systems connected in series, the first represented by the electroheating cells 7" which includes the electrode pairs 20, 50 and the second represented by sight glass electrode cells 100 and 110.

The impedance of each of the sight glass electrode cells depends upon the amount of liquid egg present between the metal end caps and the rate of movement of such egg therethrough. The longer the length of the glass tubes 106, 116 and the larger their inside diameter, the more voltage is required. An increase in the inner diameter of the glass tubes 106, 116 by using a thinner material also decreases the heating by increasing the amount of material in the sight glass requiring electroheating or requiring application of higher voltage.

In summary, in that portion of apparatus 80 in which the liquid egg passes through the gaps between electrode body 20 and central electrode 50, a relatively small voltage drop occurs through the liquid egg. The electroheating is effectuated at voltage drops of 100 to 200 volts and currents of 300 to 400 amperes. Currents of between about 100 and about 500 amps may be used. Even higher voltages and currents could be used in different configurations or to obtain higher temperatures and/or faster heating. This is particularly true when processing foods other than liquid egg. With reference to the illustrative example discussed herein, the loss of voltage as heat to the liquid egg is about 200 volts. The electrical energy travels between electrodes 20 and 50 transverse to the flow of the liquid egg in cell 7". However, in the sight glass electrode cells 100 and 110, the electroheating is effectuated at relatively higher voltages of 3000 volts at currents of approximately 5 through 100 amps and, more particularly about 15 amperes (calculated). Higher currents and voltages may also be used as explained immediately above. In this portion of apparatus 80, the electroheating is carried out by a current which flows parallel to the flow of liquid egg, e.g. from plate 104 to 102 and 114 to 112 respectively. For simplicity, an electrical system which loses a minimum of energy as heat through resistance and inductance except to the liquid egg has been provided.

It is interesting to note the difference in length between glass tube 106 and glass tube 116. Without wishing to be bound by any particular theory, it is believed that this difference in length is necessary to compensate for the changing resistivity of the liquid egg. In a perfect system utilizing a material whose resistivity is unchanged during heating and assuming identically sized sight glass electrode cells 100 and 110, the same degree of heating should occur in each electrode when arranged in the system illustrated in FIG. 6. However, as discussed previously, the resistivity of egg is believed to drop as it is heated, either as a direct result of the heating or because of limited coagulation. This drop in resistivity would be most acute in sight glass electrode cell 110 as the liquid egg reaches its maximum heated temperature therein. As resistivity of the egg drops, the current would increase and the degree of heating realized in sight glass electrode cell 110 would be measurably less than that occurring in sight glass electrode cell 100. By increasing the length of the glass tube 116, however, electricity flowing between plates 114 and 112 must traverse a greater amount of liquid egg and this increases the overall resistance in the electrode. Thus by increasing the length of glass tube 116, it is possible to compensate for the change in resistivity of the liquid egg being treated. If other sorts of food are processed using this aspect of the present invention, and if these food exhibit a relatively uniform resistivity at treatment temperatures, then the dimensions of sight glass electrode cells 100 and 110 should be maintained roughly equal. As will be explained in more detail herein, the fact that the resistivity of the liquid egg diminishes with heat, if indeed it does, does not necessarily hold true for caked on or cooked egg which might coat an electrode's surface.

When the sight glass electrode cells or similarly functioning cell is operably and electrically linked to the concentric electrode containing cells or other similarly functioning electroheating cell, unusually long run times and total change in temperature may be realized. In fact, even with a food such as liquid egg which can readily coagulate and foul the apparatus, run times of a day or more may be possible and total temperature changes of tens of degrees may be realized. Without wishing to be bound by any particular theory of operation, it is believed that the electrodes are very forgiving and very resistant to arcing. Consider for example the electroheating of liquid whole egg. The inventor believes that the electroheating apparatus illustrated in FIGS. 5 and 6 can be operated with almost no adverse consequence for a period of several hours. At lower heating temperatures, in fact, there may be essentially no limit to the amount of time that the system can run. Assuming, however, that operating temperatures of approximately 150° F. or higher are reached, then some buildup of coagulated egg may result on the surfaces of one or more of the electrodes.

The exact nature of the change in resistivity of egg in its liquid form and/or in its totally coagulated form has yet to be determined. It is believed, however, that egg when in a cooked coagulated form on the surface of the various electrodes of electroheater 7 increases the resistance therein. When, after extended operation, some critical level of coagulation is reached, the resistance of the system increases rapidly. As the resistance increases, the current decreases and, as the generator used attempts to keep the current at a constant level, a higher voltage is applied across the electrodes. The increase in voltage coupled with the increase in resistance should yield an increase in temperature within the electrode stressing the system even further by accelerating additional coagulation. In practice, it has been observed that when this critical point is reached, a relatively small drop in current is realized (on the order of 10 amps). Shortly thereafter, the temperature imparted to the food being treated is increased as well, by, for example, half a degree or so. At that point, unless some steps are taken, the system will rapidly exhibit a runaway, requiring shutdown. On the other hand, if the voltage is lessened, then a new electronic equilibrium can be formed and additional electroheating at the intended change in temperature can be obtained. Generally, once this first critical point is realized, additional critical points will occur on an ever more frequent basis. Of course, each may be adjusted either manually or automatically such that electroheating can continue for quite some time. Eventually, however, the system will become overloaded, probably due to great resistances, shorting across electrodes and/or fouling and the system will have to be shut down and cleaned. If the food being electroheated is not coagulable, if coagulation temperatures are not used, or if little cooking of coagulated product can take place on the surface of the electrodes, then there is no reason why this system should ever reach a critical point.

It is also interesting to note that the possibility of fouling and arcing of the electrode system in accordance with this aspect of the present invention can be further mitigated by, for example, increasing the flow of liquid egg therethrough. As the flow rate of the liquid egg increases, the liquid egg tends to dislodge bits of coagulated egg which may be stuck to an electrode. The faster flowing liquid egg essentially cleans the effected electrode. It is also more difficult for liquid egg to stick to the surface of the electrodes when it is moving faster. Furthermore, the use of this electrical system at relatively low changes in temperature and at generally lower pasteurization temperatures can also lengthen the run time considerably as the detrimental effects of coagulation are lessened. For example, liquid whole egg processed at under 148° F. can be processed continuously for at least twelve hours, and maybe even several days. However, processing to a temperature of 158° F. from an initial temperature of 150° F. would probably not be possible for more than several hours.

In addition, fouling and arcing can be retarded further by placing a cooling jacket, previously described in connection with the concentric electrodes, around each of the sight glass electrode cells. This will help prevent the sticking of any coagulated food or caking of the electrodes when in use.

While the electroheating system just described was described principally in terms of the ability to process liquid egg, and in particular, liquid whole egg, it can of course be employed advantageously for the processing of other foods such as soups, sauces, pastes, broths, milk, cheese, juices, vegetables, purees and the like. Indeed, because most of these foods are not as demanding in terms of coagulation and heat sensitivity as, for example, liquid egg, it is far easier to employ these apparatus and techniques associated therewith with other foods.

The foregoing will be better understood with reference to the following examples. These examples are for the purposes of illustration. They are not to be considered limiting as to the scope and nature of the present invention.

For the purposes of these examples, the various dimensions and operating conditions of the electrodes are as described in the illustrative example of the Detailed Description of the Preferred Embodiment section, unless otherwise noted.

EXAMPLE 1

Concentric electrodes as illustrated in FIG. 3 were utilized to electroheat and pasteurize Table Ready brand liquid whole egg, Three foot long sight glasses were used and were connected to the inlet and outlet of the first and last concentric electrodes, respectively. However, these glass tubes were not used as electrodes, but rather as a way of insulating the concentric electrodes. Table Ready brand liquid whole egg was processed with a total change in temperature of 4° F. using an alternating frequency of 220 kHz and a flow rate of 390 lbs. per minute. A pasteurization temperature of 152° F. was obtained for 3½ hours. Thereafter, the temperature of the system started to rise and the overload signal was activated. The system was shut down and restarted and run for approximately 3 hours and 15 minutes further. Again, the change in temperature realized was 4° F. The calculated voltage across electrode cell 7"b from electrode 50 to return 92 was about 58.1 volts. The current measured at 71 was 460 amps.

EXAMPLE 2

Table Ready brand whole egg was processed at a flow rate of 390 lbs. per minute at a change in temperature of 5° through the device described in Example 1. A final pasteurization temperature of 150° F. was attained. The run lasted for approximately three hours and 20 minutes before it was shut down. The calculated voltage as measured in Example 1 was about 70.15 volts and the current was 440 amps.

EXAMPLE 3

The device 80 as illustrated in FIG. 6 was utilized in accordance with this example wherein 5 concentric electrodes and 2 sight glass electrode cells as described in the illustrative portion of the Detailed Description of the Preferred Embodiment section were utilized. Table Ready liquid whole egg was run with a flow rate of 384 lbs. per minute from an initial temperature of about 140° F. to a final temperature of 147.9° F. for a period of over twelve hours. Using a conventional plate heat exchanger to process an 8° increase in temperature from 140° F. to approximately 148° F. at this flow rate would, at best, have lasted for approximately 8 to 9 hours. By the use of the electroheating system in accordance with this aspect of the present invention, the run time was increased by up to 50%. The calculated voltage as measured in Example 1 was 135 volts.

EXAMPLE 4

Table Ready liquid whole egg was processed at a flow rate of 402 lbs. per minute using the electroheating device as described in Example 3. The frequency used was 166 kHz. The system ran for two hours without any problem and a resulting change in temperature was 4.2° F. was realized. Thereafter, the frequency utilized was increased to 232 kHz and the voltage was increased to 3350 volts peak to peak when measured between electrode 50 of cell 7"b and end 76 of tank coil 72. The system measured 495 amp at 71 and a power of 62 KW. The system ran for one hour at a change in temperature of 9.5° F. (final temperature 156° F.). Arcing to ground occurred because the sight glass electrode cells used incorporated a nylon insulating tube. This tube absorbed moisture and allowed for arcing.

EXAMPLE 5

This example was run utilizing the system as described in Example 3 with a frequency of 232 kHz and an initial flow rate of 228 lbs. per minute. An initial change in temperature of 5.8° F. was obtained up to a temperature of 156° F. for a period of 45 minutes. Then, the flow rate was approximately doubled and the change in temperature was 3.6° F. This continued for 15 minutes and a final temperature of 154° F. was reached. Finally, the system was again returned to 228 lbs. per minute of Table Ready brand liquid whole egg and the power available through the generator was maximized. A temperature change of 11.5° F. was realized for 30 minutes.

What is claimed is:

1. An electrically stable electroheater for continuously treating pumpable food comprising:

a source of AC electric current;

a food inlet;

at least one first electroheating cell in fluid communication with said inlet, said cell including a first electrically conductive electrode and a second electrically conductive electrode, said first and said second electrodes being separated by a first gap such that said food can flow through said first gap, said electrodes being linked to said source of AC electric current such that said current flows through said food in said first gap;

at least one resistor electrically connected in parallel to said electroheating cell for reducing arcing in and fouling of said food; and a food outlet in fluid communication with said electroheating cell.

2. The electroheater of claim 1, further comprising at least one second electroheating cell, each of said at least one second electroheating cell comprising a pair of electrically conductive electrodes separated by a second gap in which a portion of said electric current flows, each of said at least one second electroheating cell being electrically linked in parallel with said at least one first electroheating cell and in fluid communication therewith.

3. The electroheater of claim 2, further comprising at least one third electroheating cell, each of said at least one third electroheating cell comprising a pair of electrically conductive electrodes separated by a third gap in which a portion of said electric current flows, each of said at least one third electroheating cell being electrically linked in series with said at least one first electroheating cell and said at least one second electroheating cell and in fluid communication therewith.

4. The electroheater of claim 1, wherein said source of AC electric current is capable of providing a frequency of between about 100 kHz and about 450 kHz.

5. The electroheater of claim 1 wherein each of said electrodes includes an aperture through which said food can flow and wherein said first and said second electrodes are separated by a hollow insulating member in said gap such that said food can continuously flow in a direction through said aperture in said first electrode into the interior of said hollow insulating member and out through said aperture in said second electrode.

6. The electroheater of claim 5 wherein said flow of said electric current is parallel to said direction of food flow.

7. The electroheater of claim 1 wherein said first and second electrodes of said electroheating cell are concentric electrodes.

8. The electroheater of claim 7 wherein said first electrode has a generally cylindrical food engaging inner surface extending from a first end to a second end with an inside diameter of a first predetermined value; a second electrode having a generally cylindrical food engaging outer surface extending from a first end to a second end with an outer diameter of second predetermined value which is less than said first predetermined value; and a means for positioning said second electrode inside of said first electrode with said outer surface of said second electrode spaced apart from said inner surface of said first electrode to form said gap therebetween through which food to be electroheated is passed.

9. The electroheater of claim 1, wherein said food is liquid egg.

10. A method of continuously electroheating food without substantial arcing or fouling for an extended run time comprising the steps of:

continuously providing food to be electroheated;

passing said food through an electrically stable electroheater comprising:
a source of AC electric current,
a food inlet,
at least one electroheating cell in fluid communication with said inlet, said cell including a first electrically conductive electrode and a second electrically conductive electrode, said first and said second electrodes being separated by a gap such that said food can flow through said gap, said electrodes being linked to said source of AC electric current;
at least one resistor electrically connected in parallel to said electroheating cell, and
a food outlet in fluid communication with said electroheating cell; and
electroheating said food by passing electric current between said first and second electrodes.

11. The method of claim 10, wherein each of said electrodes includes an aperture through which said food can flow and wherein said first and said second electrodes are separated by a hollow insulating member in said gap, and wherein said step of passing said food includes the step of:

passing said food through said aperture in said first electrode into the interior of said hollow insulating member and out through said aperture in said second electrode.

12. The method of claim 11, wherein said first and second electrodes of said electroheating cell are concentric electrodes, and wherein said step of passing said food includes the step of:

passing said food through said gap so that said food flows in a direction substantially perpendicular to said AC electric current.

13. The method of claim 10, wherein said food is liquid egg.

* * * * *

UNITED STATES PATENT AND TRADEMARK OFFICE
CERTIFICATE OF CORRECTION

PATENT NO. : 5,771,336  
DATED : June 23, 1998  
INVENTOR(S) : Thaddeus J. Polny, Jr.

Page 1 of 3

It is certified that error appears in the above-identified patent and that said Letters Patent is hereby corrected as shown below:

Title Page,  
Item [56] References Cited, under OTHER PUBLICATIONS, "Alkslog" should be -- Alkskog --.  
In L Alkskog publication, "asteurization" should be -- Pasteurization --.  
In "Annual Report ..." publication, "Projects" should be -- Projects" --; and "1984,"" should be -- 1984, --.  
In first S. Palaniappan et al. publication, "Electrically" should be -- Electricity --.  
In M. Sill publication, "NSCU" should be -- NCSU --.

Figure 7:
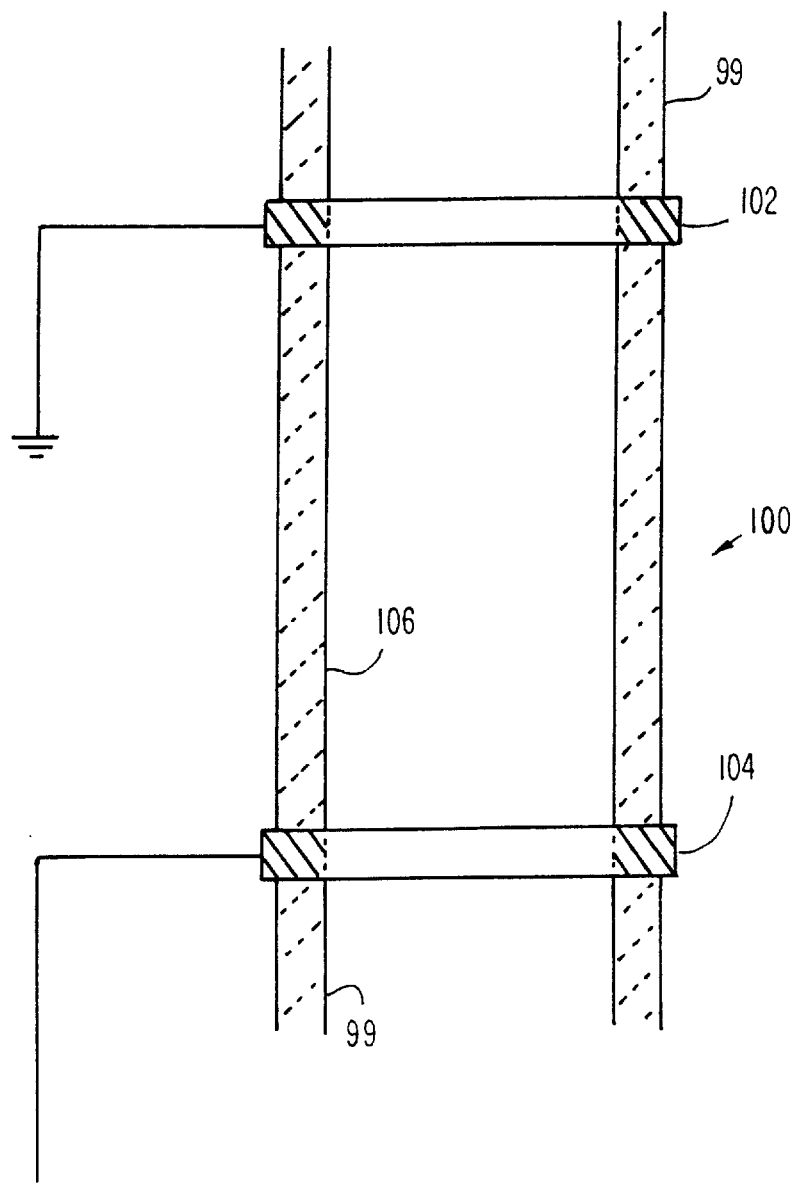
FIG. 7 is an enlarged cross-section of an electroheating element shown in FIG. 6.

In the drawings,  
Sheet 5, FIG. 6, the phrase -- See FIG. 7 -- should appear as follows:

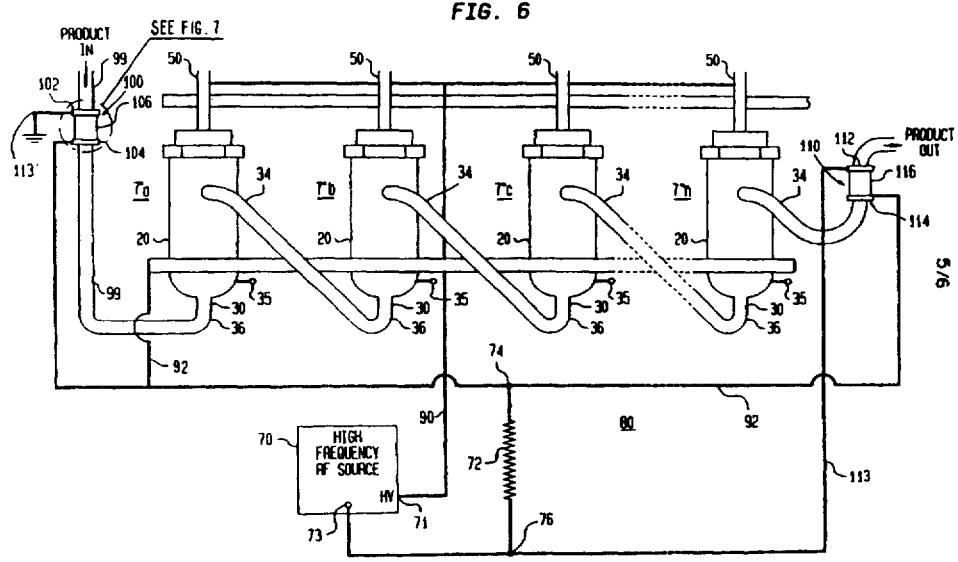

Column 1,  
Line 35, "latter" should be -- matter --.

Column 2,  
Line 7, "involves" should be -- involve --.  
Line 67, "are" should be -- is --.

UNITED STATES PATENT AND TRADEMARK OFFICE
CERTIFICATE OF CORRECTION

PATENT NO. : 5,771,336
DATED : June 23, 1998
INVENTOR(S) : Thaddeus J. Polny, Jr.

It is certified that error appears in the above-identified patent and that said Letters Patent is hereby corrected as shown below:

Column 3,
Line 1, "micro-seconds" should be -- microseconds --.
Line 34, "is" should be -- are --; and "that" should be -- those --.

Column 4,
Line 38, "hold" should be --held --.

Column 5,
Line 20, "continuous" should be -- continuously --.
Line 33, "calls." should be -- cells. --

Column 7,
Line 47, "call" should be -- cell --.

Column 8,
Line 21, "cross-section" should be -- cross section --.

Column 12,
Line 28, "140 F." should be -- 140 F. and --.
Line 66, "call" should be -- cell --.

Column 15,
Line 9, "calls" should be -- cells --.
Line 32, "e.g." should be -- e.g., --.

UNITED STATES PATENT AND TRADEMARK OFFICE
CERTIFICATE OF CORRECTION

PATENT NO. : 5,771,336
DATED : June 23, 1998
INVENTOR(S) : Thaddeus J. Polny, Jr.

It is certified that error appears in the above-identified patent and that said Letters Patent is hereby corrected as shown below:

Column 20,
Line 12, "5/8" should be -- 5/8" --.

Column 21,
Line 4, "e.g." should be -- e.g., --.
Line 32, "food" should be -- foods --.

Signed and Sealed this

Twenty-eighth Day of August, 2001

*Attest:*

*Attesting Officer*

NICHOLAS P. GODICI
*Acting Director of the United States Patent and Trademark Office*